(12) United States Patent
Boge et al.

(10) Patent No.: US 11,027,504 B2
(45) Date of Patent: Jun. 8, 2021

(54) SYSTEM FOR THE PRODUCTION OF FIBER COMPOSITE COMPONENTS

(71) Applicant: Broetje-Automation GmbH, Rastede (DE)

(72) Inventors: Christian Boge, Mosbach (DE); Matthias Meyer, Weil am Rhein (DE); Axel Peters, Bremen (DE)

(73) Assignee: Broetje-Automation GmbH, Rastede (DE)

(*) Notice: Subject to any disclaimer, the term of this patent is extended or adjusted under 35 U.S.C. 154(b) by 751 days.

(21) Appl. No.: 15/555,056

(22) PCT Filed: Mar. 4, 2016

(86) PCT No.: PCT/EP2016/054680
§ 371 (c)(1),
(2) Date: Aug. 31, 2017

(87) PCT Pub. No.: WO2016/142299
PCT Pub. Date: Sep. 15, 2016

(65) Prior Publication Data
US 2018/0036966 A1 Feb. 8, 2018

(30) Foreign Application Priority Data
Mar. 6, 2015 (DE) ...................... 10 2015 002 775.1

(51) Int. Cl.
*B29C 70/34* (2006.01)
*B29C 70/38* (2006.01)
*B29C 33/34* (2006.01)

(52) U.S. Cl.
CPC .............. *B29C 70/34* (2013.01); *B29C 70/38* (2013.01); *B29C 33/34* (2013.01)

(58) Field of Classification Search
CPC ......... B29C 70/34; B29C 41/00; B29C 43/00; B29C 70/30; B29C 64/194; B29C 70/347;
(Continued)

(56) References Cited

U.S. PATENT DOCUMENTS 3,574,040 A 4/1971 Chitwood et al.
5,110,395 A 5/1992 Vaniglia
(Continued)

FOREIGN PATENT DOCUMENTS

| CA | 2857682 | 1/2006 |
|---|---|---|
| DE | 10005202 | 11/2000 |

(Continued)

OTHER PUBLICATIONS

Non-Final Office Action for U.S. Appl. No. 15/556,226 dated Jun. 13, 2019 (22 pages).
(Continued)

*Primary Examiner* — Stella K Yi
(74) *Attorney, Agent, or Firm* — Pauly, DeVries Smith & Deffner LLC

(57) ABSTRACT

Various embodiments relate to a system for the production of fiber composite components, having at least a first fiber placement machine for the application of fiber layers to a workpiece, and a further processing station, distinct from the fiber placement machine, for the modification of the workpiece, wherein the workpiece can be brought both to the fiber placement machine and to the further processing station by means of an automated conveyor means. Various additional embodiments are also disclosed herein.

26 Claims, 12 Drawing Sheets

(58) Field of Classification Search
CPC ....... B29C 70/38; B29C 70/382; B29C 70/70;
B29C 70/384; B29C 70/364; B29C
70/386; B29C 70/40; B29C 70/541
See application file for complete search history.

(56) References Cited

U.S. PATENT DOCUMENTS

| | | | |
|---|---|---|---|
| 6,540,000 | B1 | 4/2003 | Darrieux et al. |
| 7,128,869 | B2 | 10/2006 | Habisreitinger et al. |
| 7,208,219 | B2 | 4/2007 | Polk, Sr. et al. |
| 8,157,212 | B2 | 4/2012 | Biornstad et al. |
| 8,496,206 | B2 | 7/2013 | Johnson et al. |
| 9,409,356 | B2 | 8/2016 | Karb et al. |
| 10,603,849 | B2 | 3/2020 | Boge et al. |
| 2002/0059976 | A1* | 5/2002 | Taggart .................. B29C 70/48 156/177 |
| 2004/0253429 | A1 | 12/2004 | Polk et al. |
| 2007/0170619 | A1 | 7/2007 | Behre |
| 2009/0032195 | A1 | 2/2009 | Slyne |
| 2009/0148647 | A1 | 6/2009 | Jones et al. |
| 2014/0260858 | A1 | 9/2014 | Johnson et al. |
| 2018/0036968 | A1 | 2/2018 | Boge et al. |

FOREIGN PATENT DOCUMENTS

| | | |
|---|---|---|
| DE | 102007037072 | 2/2009 |
| EP | 1001066 | 5/2000 |
| EP | 2230070 | 9/2010 |
| FR | 2686080 | 7/1993 |
| FR | 3006938 | 12/2014 |
| WO | 9636477 | 11/1996 |
| WO | 2009042225 | 4/2009 |
| WO | 2011085792 | 7/2011 |
| WO | 2014191046 | 12/2014 |
| WO | 2016142297 | 9/2016 |
| WO | 2016142299 | 9/2016 |

OTHER PUBLICATIONS

Chinese Search Report for Chinese Patent Application No. 201680014148.8 dated Apr. 19, 2020 (2 pages) English Translation Only.
"International Preliminary Report on Patentability," for PCT Application No. PCT/EP2016/054678 dated Sep. 12, 2017 (10 pages).
"International Preliminary Report on Patentability," for PCT Application No. PCT/EP2016/054680 dated Sep. 12, 2017 (10 pages).
"International Search Report and Written Opinion," for PCT Application No. PCT/EP2016/054678 dated Sep. 15, 2016 (18 pages).
"International Search Report and Written Opinion," for PCT Application No. PCT/EP2016/054680 dated Sep. 22, 2016 (19 pages).
Notice of Allowance for U.S. Appl. No. 15/556,226 dated Dec. 18, 2019 (8 pages).
Response to Non-Final Rejection dated Jun. 13, 2019 for U.S. Appl. No. 15/556,226, submitted via EFS-Web on Nov. 13, 2019, 11 pages.

* cited by examiner

SYSTEM FOR THE PRODUCTION OF FIBER COMPOSITE COMPONENTS

CROSS-REFERENCE TO RELATED APPLICATIONS

This application is a national stage application under 35 U.S.C. 371 of International Patent Application Ser. No. PCT/EP2016/054680, entitled "System for Manufacturing Fiber Composite Components," filed Mar. 4, 2016, which claims priority from German Patent Application No. DE 10 2015 002 775.1, filed Mar. 6, 2015, the disclosure of which is incorporated herein by reference.

FIELD OF THE TECHNOLOGY

The disclosure relates to a system for the production of fiber composite components. The disclosure in addition relates to a fiber placement machine for incorporation into a system. The disclosure also relates to a method for the laying of a fibrous web on a workpiece by a fiber placement machine of the system.

BACKGROUND

A fiber placement machine for the manufacture of fiber layers is disclosed in publication WO 2009/042 225 A2. The fiber placement machine has a three-axis table, which is adapted for rotation relative to a fiber placement head about a vertical axis of rotation and is adapted for linear movement in two directions. Arranged on the three-axis table is a vacuum table, which serves as a smooth tool surface. The fiber placement head is arranged securely above the vacuum table on a machine frame and has guide rails for a fiber band, which are adapted for displacement in a vertical direction by means of a linear actuator, in order to deliver the fiber band to the tool surface.

SUMMARY

The disclosure has as its object to propose a system for the manufacture of fiber composite components in particular for the manufacture of high volumes, which permits a rapid and problem-free manufacturing process.

This object is accomplished by a system for the production of fiber composite components, comprising at least a first fiber placement machine for the application of fiber layers to a workpiece; and a further processing station, distinct from the fiber placement machine, for the modification of the workpiece, wherein the workpiece can be brought both to the fiber placement machine and to the further processing station by means of an automated conveyor means.

Fiber placement machines have been used until now as stand-alone machines for the manufacture of highly individual and complicated component parts in small volumes. The linking of a fiber placement machine to an automated production of workpieces is proposed in order to achieve a high throughput of workpieces within the framework of series production.

As a general rule, a system can have a number of fiber placement machines of different design in order to optimize the process of the workpiece production.

In an embodiment, the system comprises a second fiber placement machine, which is separated spatially from the first fiber placement machine and is connected to the first fiber placement machine by means of the automated conveyor means. In some embodiments, the at least two fiber placement machines are structurally identical in this case.

In a first possible further development, the fiber placement machines in this case are envisaged as parallel processing stations, which perform the same processing steps on simultaneously processed workpieces. The throughput can be increased as a result and can be adapted to the possibly higher throughput of other processing stations. It is conceivable in principle, however, that the fiber placement machines perform different processing steps.

It is proposed in an alternative or supplementary embodiment hereto that the fiber placement machines perform different processing steps one after the other on a workpiece as sequential processing stations. The manufacture of the workpiece can be further optimized as a result, and in particular other processing steps can be undertaken between the processing operations in the fiber placement machines.

In general terms, the system advantageously comprises at least one buffer station for receiving, storing and transferring a number of workpieces. This permits considerably improved logistics in an automated production process with a high throughput. The workpieces can remain in the buffer stations on their respective pallets.

In an embodiment, the further processing station comprises at least one of the following selected from the group made up of a forming device, in particular a pressing device, a temperature chamber and/or a painting device. A suchlike processing station is advantageously combined in automated form with the fiber placement machine, in particular for the manufacture of volume components for automobiles or aircraft.

In order to reduce the footprint and for generally improved flexibility, the automated conveyor comprises a loading device, by means of which loading and unloading of the fiber placement machine from one side only is facilitated. This permits the insertion and withdrawal of the workpiece into and from the fiber placement machine in the manner of a blind alley. One generally advantageous possibility is the replacement of a processed workpiece with an unprocessed workpiece at the same time by means of the loading device.

The loading device in this case is embodied in a detailed configuration as a rotational exchange device, which comprises a rotatable holder for receiving at least two workpieces.

Various embodiments further relate in general to a fiber placement machine, which is combined with a previously described loading device, by means of which loading and unloading of the fiber laying system from one side only is facilitated. It will be appreciated that, in addition, a suchlike fiber placement machine can comprise each of the further characterizing features of fiber placement machines described herein.

Generally, a placement head of the fiber placement machine can be adapted for displacement in a vertical plane, wherein an angle between the plane and a loading path of the fiber placement machine is between 0° and 30°. This permits the construction of a space-saving and in particular narrowly configured fiber placement machine. In some embodiments, the loading path and the plane in this case are angled by 0°, that is to say arranged in parallel or on a line. The ability of the placement head to move only in the vertical plane is a generally advantageous feature.

The expression loading path is used generally to denote an in particular straight section for the automated transport of the workpiece between an external region of the fiber placement machine and a processing position of the workpiece. The loading path is thus, on the one hand, a part of the automated conveyor means and, on the other hand, a part of the fiber placement machine.

In one possible illustrative embodiment, a placement head of the fiber placement machine is adapted for displacement in a vertical plane, wherein a fiber coil store of the fiber placement machine comprises a plurality of fiber coils with mutually parallel coil axes, wherein an angle between the coil axes and the vertical plane is between 60° and 90°. This also permits, as a result of the arrangement of the fiber coil stores and corresponding fiber feeds, a fiber placement machine of narrow construction. In some embodiments, the angle is about 90°. In this way, the loading path, the placement head and the fiber coil stores can be arranged approximately in a line one after the other. In particular, at least two fiber coil stores are proposed, which are each allocated to a group of fiber strands and are positioned next to one another.

The previously described embodiments of the fiber placement machine with regard to the orientation of the plane of movement of the placement head, the loading path and/or the coil axes permit substantial degrees of freedom in the structural design and spatial dimensioning. This relates in particular to the arrangement of further components of the fiber placement machine, in particular an electric control unit and an air conditioning unit.

An embodiment further relates in general to a system for the production of fiber composite components, comprising at least one first fiber placement machine for the application of fiber layers to a workpiece; and a further, structurally identical or different processing station for the modification of the workpiece; wherein the workpiece can be brought both to the fiber placement machine and to the further processing station by means of an automated conveyor means, wherein the conveyor means comprises a loading device, by means of which loading and unloading of the fiber laying section from one side only is facilitated. The loading device in this case is embodied as a detailed configuration of the rotational exchange device, which device comprises a rotatable holder for receiving at least two workpieces. A suchlike system can be combined with all the individual characterizing features of a previously described system. In particular, the fiber placement machine can be a fiber placement machine of the kind described herein.

At least one fiber placement machine of the system is embodied as a fiber placement machine having a tool table, a placement head, and a fiber supply unit. Laying is facilitated by advancing the fibers around the displacement travel, in the process of which the fibers are drawn from the supply unit before the actual application, wherein the fibers are usually unwound from rollers and are guided over a number of deflectors. The fibers no longer require to be drawn from the fiber supply unit during the subsequent, direct application to the workpiece. This division of the fiber feed permits an optimization of the respective movement section of the placement head.

The expression workpiece is used for the purposes to denote any substrate, onto which the fibers are applied systematically. In particular, a suchlike substrate can be a plane surface, for example in the form of a subsequently removable film or an anti-friction coated surface of a carrier, from which the fiber layer is later released. A partially completed fiber layer or another preliminary stage of a product which is to be coated with fibers likewise constitutes a workpiece for the purposes of the disclosure. The substrate can also be a preformed molding tool, in which a defined form of a subsequent under side of the fiber layer is configured.

The individual fiber strands in a fiber placement machine are generally pre-coated with a bonding agent such as already at the time when they are present in the fiber supply unit, which is also designated as a "matrix" in the region of the fiber composite components. Suchlike pre-coated fibers permit a particularly controlled bonding or attachment to the fiber layer, wherein the quantity of bonding agent at any time is optimally dosed. In order to improve the binding operation, in particular a heating device, for example in the form of a radiant heater, can be provided on the placement head. Basically, the feeding of pre-coated fibers to the placement head is associated with specific requirements in comparison with uncoated fibers. The embodiment of a fiber placement machine is thus able to optimize the fiber transport for coated fibers to a particular degree. Suchlike bonding agents are also designated as a matrix in specialist circles.

The expression releasable clamping device is used to denote any device which is adapted, in a clamped state, for exerting sufficient folding forces on the fiber strands to draw these reliably from the fiber supply unit against their friction-induced resistance.

The expression fiber supply unit is used for the purposes of the disclosure to denote any storage area for the issue of the fiber strands. In particular, the respective fiber strands can be wound onto interchangeable coils. The fiber supply unit also comprises deflectors for the fiber strands, by means of which feeding to the moving placement head takes place. Because of this, positioning of the interchangeable coils or of a coil store relative to the placement head is freely selectable to a great extent.

In embodiments, the coils can sit on axes of rotation that are driven against an unwinding direction, wherein the drives of the axes of rotation exhibit a torque limitation. The torque limitation can be effected, for example, by a frictional coupling or also by a torque-dependent control of an electric drive. In this way, the respective fiber strand can be maintained at a defined pretension, if necessary, in particular during unwinding.

In general, the fiber supply unit can have one or a number of dancer magazines, furthermore, in order to maintain the transport of the fiber strands under defined tension and to even it out.

A generally advantageous feature is that the workpiece is accommodated in the fiber placement machine pivotably about an axis, so that the direction of laying of the fibers relative to the workpiece is adapted for adjustable variation. Depending on requirements, a holder for the workpiece can also exhibit other movements, for example in a plane parallel to the direction of laying.

In an embodiment, the fiber supply unit is disposed in a locationally fixed manner. This permits a large stock of fiber strands with good access for maintenance. In some embodiments, although not necessarily, the placement head is movable only in precisely one plane relative to the fiber supply unit. A suchlike limitation of the movement of the placement head in one plane is achievable with relatively simple means for the guiding of the fiber strands between the placement head and the fiber supply unit.

Generally, it is envisaged that the clamping device can be released during laying of the section of the fibrous web. A length of the fibrous web advanced around the displacement travel, which is present in a storage area between the fiber supply unit and the placement head, is laid in the process. The placement head in this case moves predominantly in the opposite direction to the movement by means of which advancing of the fibrous web is effected.

In a generally detailed configuration, the clamping device comprises at least one, and in particular two, pinch rollers interacting with one another. The use of pinch rollers reduces the accumulation of dust from the bonding agent and/or fibers and in a simple manner permits the establishment of a breakaway torque for the protection of the system in the event of a malfunction. In some embodiments, the pinch rollers can be equipped with a freewheel against the direction of drawing. As a result, the pinch rollers can continue to be pressed against one another, for example if a conveying member arranged downstream of the pinch rollers already continues to advance the fiber strands for laying. In a detailed configuration, the pinch rollers are released only shortly after the start of a suchlike further advancing, in order to even out the guiding of the fiber as a whole.

A generally advantageously embodied placement head comprises two feeds extending at an angle with respect to one another, wherein by means of a first of the feeds a first group of fiber strands and by means of the second feed a second group of fiber strands are guided into a crossing region, in order to combine the two groups of fiber strands into the fibrous web. The groups of fiber strands in this case can be arranged offset perpendicularly to the direction of laying by a fiber strand width, and the combined groups of fiber strands can be homogenized, for example by means of a compacting roller, and applied to the workpiece. A suchlike placement head with two guides can be embodied substantially mirror-symmetrically with respect to the orientation of the guides with respect to a central plane.

Generally, the fibers can be adapted for separation by means of a cutting device arranged on the placement head, wherein the cutting device comprises a plurality of separately controllable cutting members, which are able to separate different parts of the fibers transversely to the direction of laying. As a result, in general, the start and/or the end of the laid web in each case can be designed in terms of its form so that a small overhang or misalignment of the fibrous web is present at any event in the boundary region, including in the case of arbitrarily formed workpieces.

In an embodiment, the cutting device in this case has an actuator member for the actuation of at least one of the cutting members, wherein the actuator member is formed separated from the cutting member. In an embodiment, the actuator member is arranged on an upper part of the placement head that is removable for maintenance purposes. A suchlike upper part can be embodied so as to be capable of being swung upwards, for example with respect to a bottom part, so that the cutting members and, where appropriate, further mechanical elements of the placement head that are subject to wear are accessible in a simple manner in the bottom part. It will be appreciated that in a design of the placement head with two guides extending at an angle to one another, a respective upper part can be arranged above each of the guides. The fiber strands can extend in particular between the upper part and the lower part in the placement head.

Advantageously, at least one pre-feed roller for the driven feed is provided on the placement head, wherein the pre-feed roller is arranged between the clamping device and a compacting roller of the placement head on the outlet side. The driven feeding of the fiber strands serves for the particularly even application of the fibrous web. In addition, the pre-feed roller serves for feeding an end of the fibrous web that has been cut off in the placement head to the workpiece, in order to start the laying of a new fibrous web.

In an embodiment, the fiber placement machine is constructed entirely on a machine frame. This permits a simple relocation or a replacement of the entire fiber placement machine in a production plant, where appropriate, but without the machine having to be dismantled into its individual component parts. A suchlike design in addition facilitates the integration of the fiber placement machine into an automated production plant.

A further advantage is that the fiber placement machine has a climatically sealed housing. This should be interpreted for the purposes of the disclosure in such a way that at least one region of the fiber placement machine surrounding the workpiece inside the housing is supplied with controlled air conditioning. Suchlike air conditioning is important for a good result, in particular during and immediately after the laying of fibrous webs. Air conditioning for the purposes of the disclosure also comprises a simple temperature conditioning without any influence on the air humidity.

The workpiece can be arranged on an automatically transportable pallet in order to be able to operate the fiber placement machine simply and in order to facilitate its integration into an automated production plant. The expression pallet is understood for the purposes of the disclosure to denote any interchangeable carrier for the workpiece.

As a result, in a possible further development, transportation space can be saved by the fact that a surface of the pallet carrying the workpiece is inclined at an angle of less than 30 degrees with respect to a vertical. This includes in particular a perpendicular orientation of the surface. A large ceiling height of a production hall can be utilized in this way, without too much space being occupied in the width in conjunction with the transport and feeding of the pallet with the workpiece. In this respect, it can also be proposed in addition that the direction of laying extends in a plane which is inclined by less than 30 degrees with respect to the vertical.

An object of the disclosure is accomplished, moreover, by a method of laying a fibrous web on a workpiece, comprising the following steps:

a. clamping the fibers to be laid in a clamping device of a placement head;

b. moving the placement head relative to a fiber supply unit into a starting position, wherein the fibers are drawn out around a displacement travel from the fiber supply unit;

c. releasing the clamping device;

d. moving the placement head from the starting position into an end position during laying of the fibers on the workpiece, so that no fibers are drawn from the fiber supply unit during the application of the fibers to the workpiece.

Uniform laying of the fibers on the workpiece is assured by this process, but without unintentional forces being introduced by simultaneous drawing out from the fiber supply unit. In addition, the rate of advance of the fibers and the rate of laying can be adjusted independently of one another, so that the process as a whole is optimized. As a general rule, drawing out of the fibers takes place in the course of a first, outgoing movement of the placement head, in which no contact exists with the workpiece. Subsequently, the placement head is positioned on the workpiece, so that the advanced fibers are deposited on the workpiece by means of a return movement.

In an embodiment, the method is implemented by means of a fiber placement machine described herein. In this case, in particular, each of the specific characterizing features of a described fiber placement machine is suitable as an individual characterizing feature for the improvement of a method.

The fibers can be moved with respect to the placement head after step c. by means of a driven pre-feed roller, wherein in particular the fibers are not drawn out from the fiber supply unit by means of the pre-feed roller. An initial feed at the start of the laying process can be achieved thereby in a simple manner.

It should be pointed out that, depending on the structural design of the fiber placement machine, an arbitrary number of intermediate steps can be provided between the above-mentioned process steps. Within the context of all of the proposed steps, it is necessary to ensure in particular that some form of fixing of the fibers is present at all times in order to prevent the fibers from leaving the fiber placement head in an uncontrolled manner.

An embodiment provides a system for the production of fiber composite components, comprising: at least a first fiber placement machine for the application of fiber layers to a workpiece; and a further processing station, distinct from the fiber placement machine, for the modification of the workpiece, wherein the workpiece can be brought both to the fiber placement machine and to the further processing station by means of an automated conveyor means.

In various embodiments, the system comprises a second fiber placement machine, in particular structurally identical to the first fiber placement machine, which is spatially separated from the first fiber placement machine and is connected to the first fiber placement machine by the automated conveyor means.

In various embodiments, a number of fiber placement machines are provided as parallel processing stations, which perform the same processing steps on simultaneously processed workpieces.

In various embodiments, a number of fiber placement machines perform different processing steps on a workpiece one after the other as sequential processing stations.

In various embodiments, the system comprises at least one buffer station for receiving, storing and transferring a number of workpieces.

In various embodiments, the further processing station comprises at least one of the following selected from the group made up of a forming device, a temperature chamber and/or a painting device.

In various embodiments, the automated conveyor means comprises a loading device, by means of which loading and unloading of the fiber placement machine from one side only is facilitated.

In various embodiments, the loading device is configured as a rotational exchange device, which comprises a rotatable holder for receiving at least two workpieces.

In various embodiments, a placement head of the fiber placement machine is adapted for displacement in a vertical plane, wherein an angle between the vertical plane and a loading path of the fiber placement machine is between 0° and 30°.

In various embodiments, a placement head of the fiber placement machine is adapted for displacement in a vertical plane, wherein a fiber coil store of the fiber placement machine comprises a plurality of fiber coils having mutually parallel coil axes, wherein an angle between the coil axes and the vertical plane is between 60° and 90°.

An embodiment provides a fiber placement machine for the manufacture of fiber layers with a system as described herein, comprising: a tool table for feeding a workpiece in a direction of feeding; a placement head for the application of fibers to the workpiece; and a fiber supply unit for feeding a number of fiber strands to the placement head; wherein the number of fiber strands on the placement head are combined into a fibrous web for application to the workpiece; wherein the placement head is adapted for displacement relative to the fiber supply unit in a direction of laying; wherein a clamping device for the releasable clamping of the fiber strands is arranged on the placement head, wherein laying of a section of the fibrous web on the workpiece is effected, after the fiber strands have been advanced around a displacement travel by means of the placement head, so that no fibers are drawn from the fiber supply unit during the application of the fibers to the workpiece.

In various embodiments, the fiber supply unit is disposed in a locationally fixed manner, wherein in particular the placement head is movable only in precisely one plane relative to the fiber supply unit.

In various embodiments, the clamping device is released during laying of the section of the fibrous web.

In various embodiments, the clamping device comprises at least one, in particular two, pinch rollers interacting with one another.

In various embodiments, the placement head comprises two feeds extending at an angle with respect to one another, wherein by means of a first of the feeds a first group of fiber strands and by means of the second of the feeds a second group of fiber strands are guided into a crossing region, in order to combine the two groups of fiber strands into the fibrous web.

In various embodiments, the fibers are adapted for separation by means of a cutting device arranged on the placement head, wherein the cutting device comprises a plurality of separately controllable cutting members, which are able to separate different parts of the fibers transversely to the direction of laying.

In various embodiments, the cutting device comprises an actuator member for the actuation of at least one of the cutting members, wherein the actuator member is formed separately from the cutting member and is arranged, in particular for maintenance purposes, on a removable upper part of the placement head.

In various embodiments, at least one pre-feed roller for the driven feed is provided on the placement head, wherein the pre-feed roller is arranged between the clamping device and a compacting roller of the placement head on the outlet side.

In various embodiments, the fiber placement machine is constructed entirely on a machine frame.

In various embodiments, the fiber placement machine comprises a climatically sealed housing.

In various embodiments, the workpiece is arranged on an automatically transportable pallet.

In various embodiments, a surface of the pallet supporting the workpiece is inclined by an angle of less than 30 degrees with respect to a vertical.

In various embodiments, the direction of laying extends in a plane which is inclined at less than 30 degrees with respect to the vertical.

In various embodiments, the respective fiber strands are wound onto interchangeable coils, wherein the coils sit on axes of rotation that are driven against an unwinding direction, wherein the drives for the axes of rotation exhibit a torque limitation.

An embodiment provides a method for laying a fibrous web on a workpiece, in particular by a fiber placement machine as described herein, comprising the steps: clamping the fibers to be laid in a clamping device of a placement head; moving the placement head relative to a fiber supply unit into a starting position, wherein the fibers are drawn from the fiber supply unit about a displacement travel;

releasing the clamping device; moving the placement head from the starting position into an end position during laying of the fibers on the workpiece, so that no fibers are drawn from the fiber supply unit during the application of the fibers to the workpiece.

In various embodiments, the fibers are moved with respect to the placement head after releasing the clamping device by means of a driven pre-feed roller, wherein in particular the fibers are not drawn from the fiber supply unit by means of the pre-feed roller.

Further advantages and features of the disclosure can be appreciated from the illustrative embodiments described below.

BRIEF DESCRIPTION OF THE FIGURES

A number of illustrative embodiments are described below and are explained in more detail on the basis of the accompanying drawings. In the drawing.

DETAILED DESCRIPTION

Figure 1:
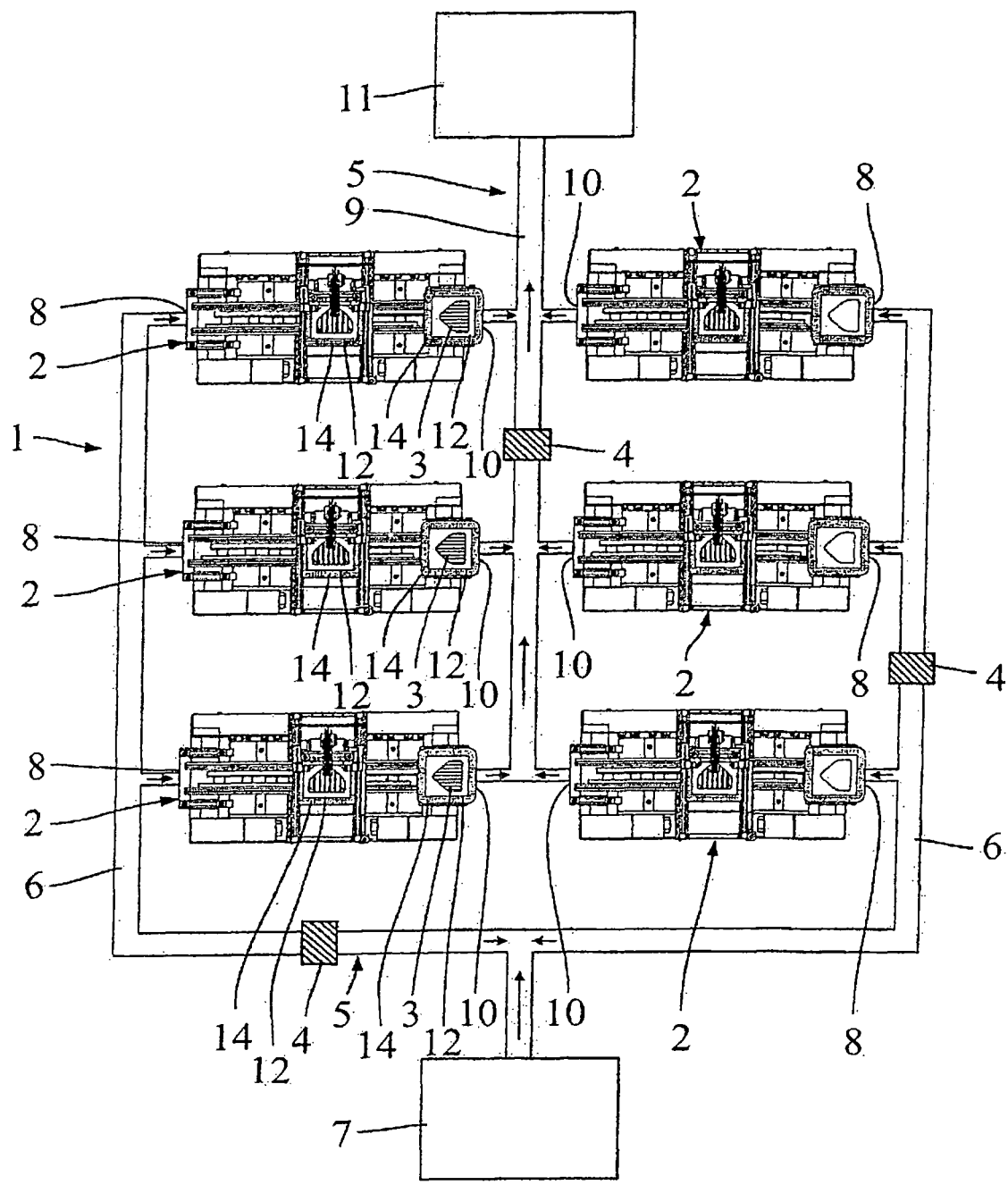
FIG. 1 depicts a schematic representation of a system for the production of fiber composite components according to a first illustrative embodiment having a number of fiber placement machines arranged parallel to one another for the manufacture of fiber layers.

A first illustrative embodiment is described below on the basis of FIGS. 1 to 4. A system for the production of fiber composite components 1, also referred to below as a fiber laying system, has a number of fiber placement machines 2 for the manufacture of fiber layers 3. The fiber placement machines 2 are structurally identical. In FIG. 1 the fiber laying system 1 has six structurally identical fiber placement machines 2, for example, which are arranged in two groups. Each group has three fiber placement machines 2, which are arranged parallel to one another. The fiber laying system 1 has a conveyor means 4, 5 for the automatic loading and unloading of the fiber placement machines 2. The conveyor means has a number of conveying carriages 4, for example, which are movable on a guide 5. The guide 5 has a loading section 6, which extends from a receiving point 7 to a respective loading side 8 of the fiber placement machines 2.

At least one conveying carriage 4 is movably arranged on the loading section 6. The guide 5 has an unloading section 9, furthermore, which extends from a respective unloading side 10 of the fiber placement machines 2 to a depositing point 11. At least one conveying carriage 4 is movably arranged on the unloading section 9.

Workpieces 12, that is to say objects to be coated with fibers 13, are movable from the receiving point 7 to the loading sides 8, and workpieces 12 coated with fibers 13 are movable from the unloading sides 10 to the depositing point 11, by means of the conveyor means 4, 5.

The workpieces 12 are arranged on pallets 14. The fiber placement machines 2 are structurally identical, so that only one of the fiber placement machines 2 is described below.

The fiber placement machine 2 has a machine frame 15 with a machine bed 16 and cross members 17, 18 arranged thereon. The machine bed 16 extends substantially in a horizontal x-direction and in a horizontal y-direction running perpendicularly thereto. The cross members 17, 18 extend parallel to the y-direction and are arranged spaced apart on the machine bed 16 in the x-direction. The cross members 17, 18 at both ends are each arranged by means of longitudinal supports 19 in a z-direction above the machine bed 16. The z-direction extends perpendicularly to the x-direction and the y-direction, so that the x-, y- and z-directions form a Cartesian coordinate system.

Two X-guide rails 20, which extend in the x-direction and are spaced apart from one another in the y-direction, are arranged on the machine bed 16. An x-carriage 21, which is movable by means of an x-drive motor 22 in the x-direction between the loading side 8 and the unloading side 10, is mounted on the x-guide rails 20. For this purpose, the X-guide rails 20 extend in the x-direction along the entire machine bed 16. Arranged on the x-carriage 21 is a tool table 23, which is pivotable about a vertical pivot axis 25 by means of a c-drive motor 24. The vertical pivot axis 25 is also designated as a c-axis. The c-axis 25 extends about a vertical pivot axis 25 parallel to the z-direction.

The tool table 23 is adapted for linear movement exclusively in the x-direction by means of the X-carriage 21. The tool table 23 serves for the positioning of the respective workpiece 12 relative to a fiber placement head 26 (referred to below as the placement head). The tool table 23 has a number of clamping units 27 for the mechanical clamping and releasing of the pallets 14 to the respective workpiece 12. The clamping units 27 are represented schematically in FIG. 3. The clamping units 27 are well known in principle and are embodied, for example, as zero-point clamps 15. The clamping units 27 are operated electromechanically, hydraulically or pneumatically. The placement head 26 is adapted for being positioned in the z-direction above the tool table 23 for laying fibers 13 on a two-dimensional or three-dimensional surface S of the respective workpiece 12.

The placement head 26 is movable in the y-direction and in the z-direction. A y-carriage 28, which is adapted for linear movement in the y-direction by means of a y-drive motor 29, is mounted on the cross members 17, 18 for this purpose. The y-carriage 28 is mounted on y-guide rails 30, which are arranged on an upper side of the cross members 17, 18. The y-carriage 28 extends between the cross members 17, 18. A z-carriage 31 is arranged on the y-carriage 28 for moving the placement head 26 in the z-direction. The z-carriage 31 is mounted on z-guide rails 32 and is movable in the z-direction by means of z-drive motors 33. The z-guide rails 32 extend parallel to the z-direction and are spaced apart from one another in the x-direction.

The placement head 26 is arranged on the z-carriage 31. The placement head 26 can be removably secured. The placement head 26 is adapted for linear movement exclusively in the y-direction. Pivoting of the placement head 26 on the z-carriage 31 is not possible.

In an alternative embodiment, not illustrated here, the placement head 26 can be pivotable, in addition or as an alternative, about a pivot axis extending parallel to the X-direction, that is to say it can constitute an a-axis. As a result, comparatively more strongly curved three-dimensional fiber layers 3 can be manufactured.

The placement head 26 is adapted for linear movement in the z-direction by means of the z-carriage 31 by at least 200 mm, in particular by at least 400 mm, and in some embodiments by at least 600 mm. For the manufacture of three-dimensional fiber layers 3, a control unit 34 of the fiber placement machine 2 is embodied in such a way that the fiber placement head 26 is adapted for linear movement by at least 50 mm, in particular by at least 100 mm, and in particular by at least 150 mm during the laying of fibers 13 by means of the z-carriage 31 over its travel.

Passage openings 35, 36 for the tool table 23 are embodied underneath the cross members 17, 18 and between the respective associated longitudinal supports 19 for moving the tool table 23 in the x-direction. A first pallet handling unit 37 is arranged on the loading side 8 for the automatic loading of the tool table 23 with pallets 14, whereas a second pallet handling unit 38 is arranged on the unloading side 10 for the automatic unloading of molding tool-pallets 14 from the tool table 23. The handling units 37, 38 are secured to the machine bed 16 on the end side in the x-direction. The pallet handling units 37, 38 are embodied as lifting units, which serve for the lifting and lowering of pallets 14.

The pallet handling units 37, 38 have at least three, in particular at least four, lifting elements 39 for this purpose. The lifting elements 39 have a piston 40, which is adapted for displacement in the z-direction in an associated cylinder 41. The lifting elements 39 are electromechanically, pneumatically or hydraulically operated. In particular, the lifting elements 39 belonging to the respective pallet handling unit 37, 38 are synchronously operated by means of the control unit 34, in order to lift or lower a molding tool-pallet 14.

The fiber placement machine 2 has a fiber supply unit 42 for the supply of the fibers 13 to be laid. The fiber supply unit 42 has two fiber coil stores 43, 44, wherein a first fiber coil store 43 is arranged in the x-direction next to the first cross member 17 and a second fiber coil store 44 next to the second cross member 18. The fiber coil stores 43, 44 are secured to the machine bed 16 on the end side in the y-direction. The fiber coil stores 43, 44 each have a number of fiber coil holders 45 for fiber coils 46. The fiber coils 46 are arranged on a respective fiber coil holder 45 and are rotatably mounted about a respective horizontal axis of rotation 47. The respective horizontal axis of rotation 47 extends parallel to the y-direction.

The fibers 13 in each case are guided from the fiber coils to the placement head 26 in the form of a fiber strand. The individual fiber strands are combined into a fibrous web and are homogenized on the placement head before the fibrous web is applied to the workpiece.

The axes of rotation 47 of the fiber coil holder are equipped in the present case with a drive, so that the coils sit on axes 47 driven against a direction of unwinding, wherein the drives for the axes 47 exhibit a torque limitation. The torque limitation can be effected, for example, by a friction coupling or also by a torque-dependent control of an electric drive. In this way, the respective fiber strand can be maintained at a defined preloading, if necessary, in particular during unwinding.

The fibers or fiber strands 13 are adapted for being guided over guide elements 50 in the form of guide rollers to a respective dancer magazine 48, 49, which serves for the compensation of changes in a tensile loading acting on the fibers 13. The respective dancer magazine 48, 49 has deflection elements 51 in the form of deflection rollers, which are adapted for displacement in the z-direction and pretension the fibers 13 by means of weights. The deflection elements 51 are also designated as dancers. Dynamic effects, which are induced on the one hand by the inertia of the fiber coils 46 and are caused on the other hand by the uneven feeding of the fibers 13 in the event of the cutting of individual fibers 13 during the laying of fibers 13, can be compensated for by the displacement of the deflection elements 51. The fibers 13 are adapted for deflection over guide elements 53 in the form of guide rollers and for being guided out of the respective fiber coil store 43, 44. The position of the deflection elements 51 is controlled during operation of the dancer magazines 48, 49. Sensors 52 are used for this purpose, which determine the deflection in the z-direction of the deflection elements 51. The deflection in the z-direction is controlled about a target position, in that the fiber coil holders 45 are equipped with a controllable brake. The brake in this case can be a torque-limited drive acting against the direction of winding.

The fibers 13 exit from the fiber coil stores 43, 44 in the x-direction and are deflected in the y-direction by vertically arranged deflection elements 54, which constitute a vertical deflection axis. The deflection elements 54 are embodied as deflection rollers. The deflection elements 54 are mounted on a supporting frame 55, which is secured between the fiber coil stores 43, 44. Horizontal deflection elements 56 in the form of deflection rollers, which deflect the fibers 13 initially from the y-direction in the z-direction and subsequently from the z-direction back in the y-direction are arranged on a side of the y-carriage 28 facing away from the placement head 26 and the fiber coil stores 43, 44. The deflection elements 56 form horizontal deflection axes. Further horizontal deflection elements 57 are arranged between the y-carriage 28 and the fiber coil stores 43, 44 above the z-carriage 31. The deflection elements 57 form horizontal deflection axes and deflect the fibers 13 from the y-direction into the z-direction to the placement head 26. The deflection elements 57 are embodied as deflection rollers.

Figure 3:
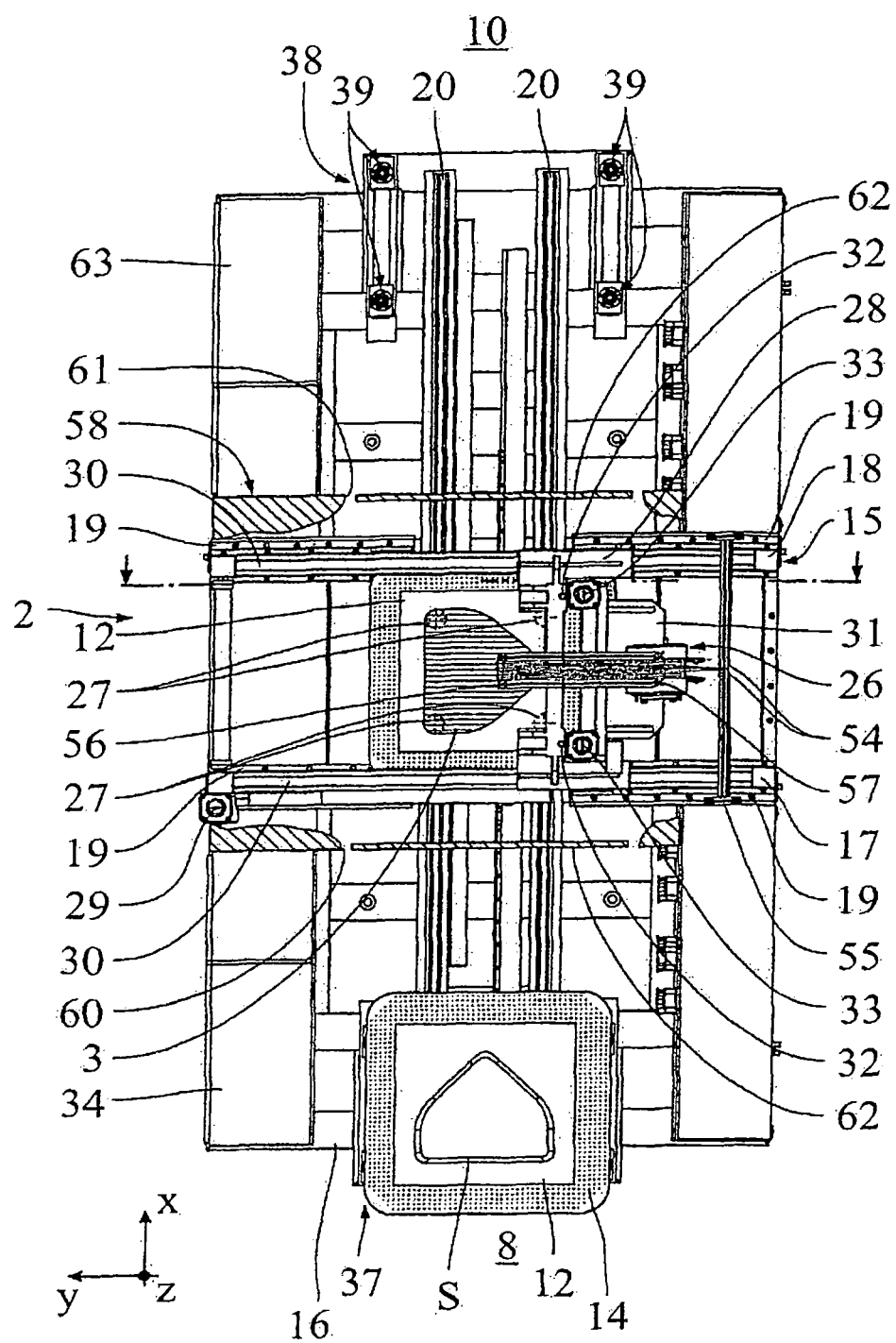
FIG. 3 depicts a top view of the fiber placement machine in FIG. 2.
Figure 4:
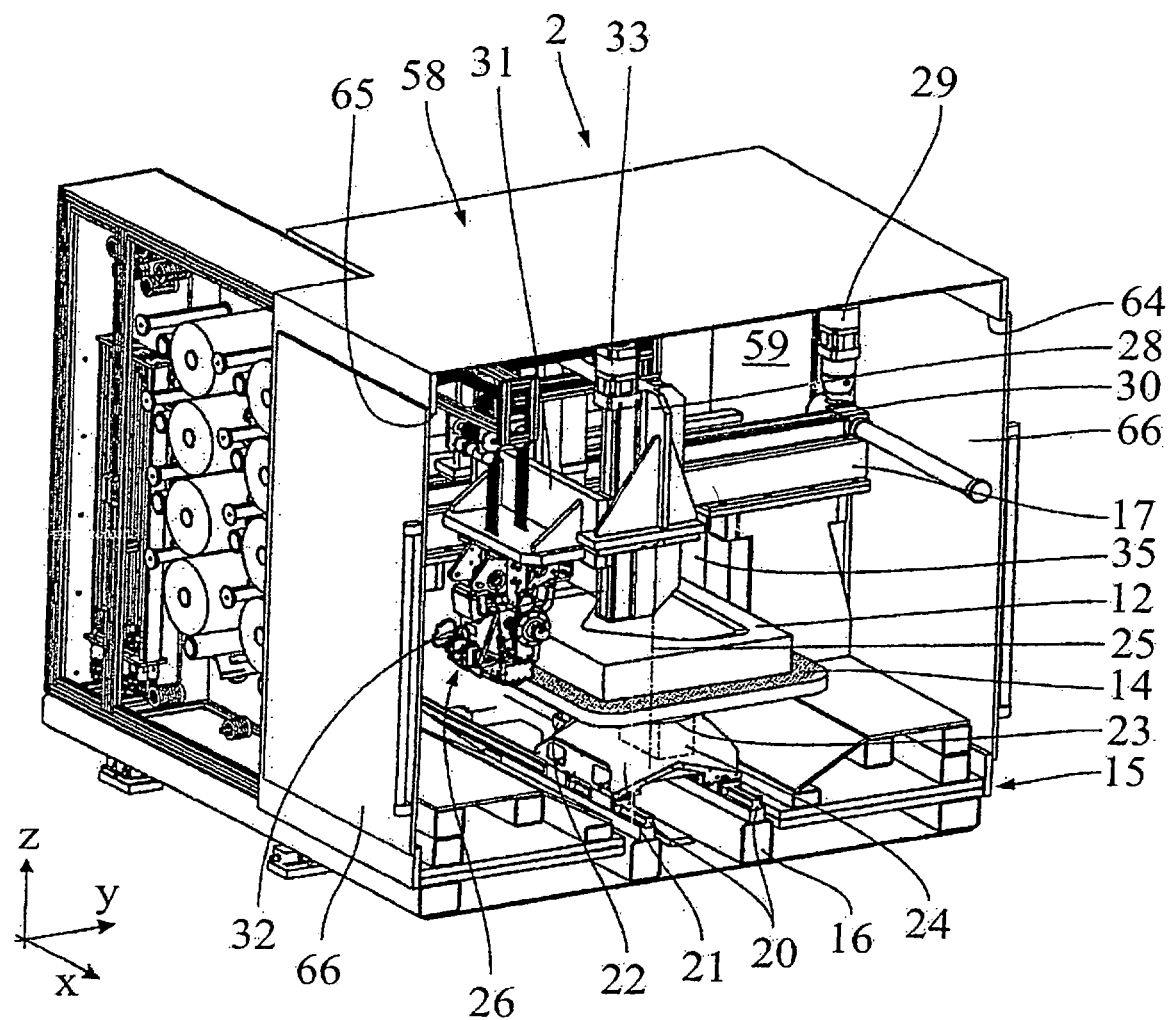
FIG. 4 depicts a perspective sectional representation through the fiber placement machine in FIG. 3 along the line of intersection IV-IV.

The fiber placement machine 2 has a machine housing 58, which is represented only in FIGS. 3 and 4. The machine housing 58 delimits an internal space 59, in which the longitudinal supports 19 are arranged with the cross members 17, 18, the y-carriage 28, the z-carriage 31 and the fiber placement head 26. The machine housing 58 has a first housing opening 60 facing towards the loading side 8 and a second housing opening 60, 61 facing towards the unloading side 10, which openings can be tightly closed and opened by respective covering elements 62. The housing openings 60, 61 and the associated covering elements 62 are only outlined in FIG. 3. The covering elements 62 are embodied, for example, as doors or segmented aprons.

For the air conditioning of the internal space 59, the fiber placement machine 2 has an air conditioning unit 63, which is arranged on the machine bed 16. Overall, a climatically sealed housing 58 for the purposes of the disclosure is formed as a result of this.

Two further housing openings 64, 65 for access to the internal space 59 are formed in the machine housing 58, which openings open into the internal space 59 between the respective adjacent longitudinal supports 19. The housing openings 64, 65 are adapted for being closed by means of doors 66.

The operating mode of the system for the manufacture of fiber composite components 1 and the fiber placement machine 2 is as follows:

The fiber placement machines 2 are automatically loaded with pallets 14 by means of the conveyor means 4, 5, on which workpieces 12 to be laid are arranged. For this purpose, the at least one conveying carriage 4 proceeds from the receiving point 7 on the loading section 6 of the guide 5 to the respective loading side 8 of the fiber placement machines 2.

Loading takes place in such a way that the conveyor means 4, 5 feeds the pallet 14 to the first pallet handling unit 37. The first pallet handling unit 37 can be present in a raised position. In the event that the first pallet handling unit 37 is not present in a raised position, this will be transferred into a raised position before or after loading. Loading of the respective fiber placement machine 2 is effected in a time-parallel manner to the laying of fibers 13 and/or to the unloading of the tool table 23.

Whereas the first pallet handling unit 37 on the loading side 8 supplies a workpiece 12 for coating, a fiber layer 3 is manufactured by means of the placement head 26. For this purpose, a pallet 14 with a workpiece 12 arranged thereon is tensioned on the tool table 23 by means of the clamping units 27. The tool table 23 is caused to move in a linear fashion in the x-direction by means of the X-carriage 21 during laying of the fiber, and is caused to pivot about the pivot axis 25 by means of the c-drive motor 24 in order to achieve a desired fiber orientation. Furthermore, the placement head 26 is caused to travel in the y-direction by means of the y-carriage 28 and is caused to travel in the z-direction by means of the z-carriage 31 during fiber laying.

A three-dimensional fiber layer 3 can also be manufactured, if required, by causing the placement head 26 to move in the z-direction.

After completion of the fiber layer 3, the x-carriage 21 is moved in the x-direction to the unloading side 10. There the second pallet handling unit 38 is present in a lowered position. For the automatic unloading of the pallet 14, this is released from the tool table 23 by means of the clamping units 27. The lifting elements 39 of the second pallet handling unit 38 are then transferred from the lowered position into the raised position, so that the pallet 14 with the finished coated workpiece 12 is unloaded automatically from the tool table 23.

The x-carriage 21 then proceeds from the unloading side 10 to the loading side 8, where the first pallet handling unit 37 in the raised position supplies the next pallet 14. If the tool table 23 is present underneath the pallet 14, the lifting elements 39 of the first pallet handling unit 37 are transferred from the raised position into the lowered position, with the result that the pallet 14 is arranged on the tool table 23. The pallet 14 is then tensioned on the tool table 23 by means of the clamping units 27. The tool table 23 is now moved in the x-direction to the placement head 26 for the next fiber laying operation, so that this can begin with the new fiber laying operation.

The lifting elements 39 of the first pallet handling unit 37 are transferred into the raised position once more for a new loading operation. Automatic unloading of the fiber placement machine 2 is effected by means of the conveyor means 4, 5 which leads from the respective unloading side 10 to the depositing point 11. Unloading of the respective fiber placement machine 2 is effected in a time-parallel manner to the loading of the tool table 23 with a pallet 14 and a workpiece 12 to be coated arranged thereon and/or to the coating of the workpiece 12 with fibers 13. For unloading, the conveying carriage 4 picks up the pallet 14 and the workpiece 12 arranged thereon from the second pallet handling unit 38 and proceeds from the respective unloading side 10 on the unloading section 9 of the guide 5 to the depositing point 11. The lifting elements 39 of the second pallet handling unit 38 are transferred after unloading into the lowered position, so that the tool table 23 can be unloaded once more.

The housing openings 60, 61 of the air-conditioned machine housing 58 are closed predominantly by means of the covering elements 62 and are opened only if the tool table 23 is moved from the loading side 8 to the placement head 26, or from the placement head 26 to the unloading side 10, or from the unloading side 10 to the loading side 8.

Laying of the fibers 13 takes place unidirectionally, if the placement head 26 is moved in the y-direction to the fiber coil stores 43, 44. During this procedure, the distance between the vertical deflection elements 54 and the horizontal deflection elements 56 is reduced, so that no fibers 13 require to be drawn from the fiber coil stores 43, 44 during the fiber laying process. As a result, fiber laying can be effected comparatively rapidly. In conjunction with the rearward movement of the fiber placement head 26 away from the fiber coil stores 43, 44, the fibers 13 are then drawn from the fiber coil stores 43, 44 for the following fiber laying operation. Any changes in the tensile loading of the fibers 13 are compensated for by means of the dancer magazines 48, 49.

A second illustrative embodiment is described below on the basis of FIG. 5. In contrast to the first illustrative embodiment, the fiber placement machines 2 are arranged relative to one another in a row in two groups. The guide 5 is embodied in such a way that the conveying carriages 4 are movable over a respective loading section 6 and a respective unloading section 9 to the loading side 8 and the unloading side 10 of each of the fiber placement machines 2. The fiber coil stores 43, 44 of the respective fiber placement machine 2 are arranged facing towards an intermediate space 67. The intermediate space 67 is formed by the two rows of fiber placement machines 2. A stock of fiber coils 46 is arranged, for example, in the intermediate space 67, in order to replenish the fiber coil stores 43, 44. Reference is made to the preceding illustrative embodiment with regard to the further construction and the further functionality of the system 1 and the fiber placement machines 2.

In general, the following is applicable: The fiber placement machines 2 permit the laying of fiber stacks made of Tow-Preg material and/or Slit-Tow material and/or dry fibers 13, which can be provided with a binder. For all the illustrative embodiments, the fibers 13 can be already pre-coated with a bonding agent in the fiber supply unit for the purposes of the disclosure.

The fibers 13 can be carbon fibers and/or glass fibers.

The fiber layers 3 can be manufactured with any desired fiber orientation and/or contour. The fiber placement machines 2 function autonomously.

The system for the manufacture of fiber composite components can have a central control unit for loading and unloading of the fiber placement machines 2. The fiber placement machines 2 are incorporated in particular into a sequential production line in order to achieve high productivity. The respective fiber placement machine 2 can be of four-axis configuration.

In the event that the fiber placement head 26 is configured pivotably about an additional a-axis (not illustrated), the respective fiber placement machine 2 is of five-axis configuration.

Both two-dimensional and three-dimensional fiber layers 3 can be manufactured with the respective fiber placement machine 2. The placement head 26 is adapted for linear movement in two axes. In particular, the placement head 26 is adapted for linear movement exclusively in two axes, namely in a horizontal y-axis and a vertical z-axis.

The movement of the placement head is thus effected in precisely one plane, which is defined here by the y-axis and by the z-axis.

The tool table 23 is adapted for linear movement in one axis and is adapted for pivoting about the pivot axis 25. In particular, the tool table 23 is adapted for linear movement exclusively in an x-axis and is adapted for pivoting about a vertical z-axis 25. This combination of axes permits the simple, flexible and efficient manufacture of two-dimensional and three-dimensional fiber layers 3 with any desired fiber orientation and/or contour.

Loading of the fiber placement machine 2 and/or of the tool table 23 takes place automatically. The conveyor means 4, 5 and the pallet handling unit 37 are provided for this purpose.

Unloading of the tool table 23 and/or the fiber placement machine 2 accordingly takes place automatically. The pallet handling unit 38 and the conveyor means 4, 5 are provided for this purpose. The conveyor means can also be embodied in such a way that the workpieces 12 or the pallets 14 are movable by means of the guide itself. For this purpose, for example, the guide constitutes a roller conveyor or a belt conveyor. Conveying carriages are then not required. The pallet handling units 37, 38 are a pallet changer, for example. The fiber placement machine 2 is accessible for loading and unloading from two opposite sides. In particular, pallets 14 can be loaded through the fiber placement machine 2. Because of the conveyor means 4, 5, the fiber placement machine 2 is suitable for integration into sequential production lines.

Fiber layers 3 with a size of 1500 mm×1500 mm×100 mm, for example, can be manufactured with the fiber placement machine 2. Suchlike fiber layers 3 are used, for example, in the automobile industry. The disclosure is not restricted to fiber layers of the size mentioned by way of example.

Figure 6:
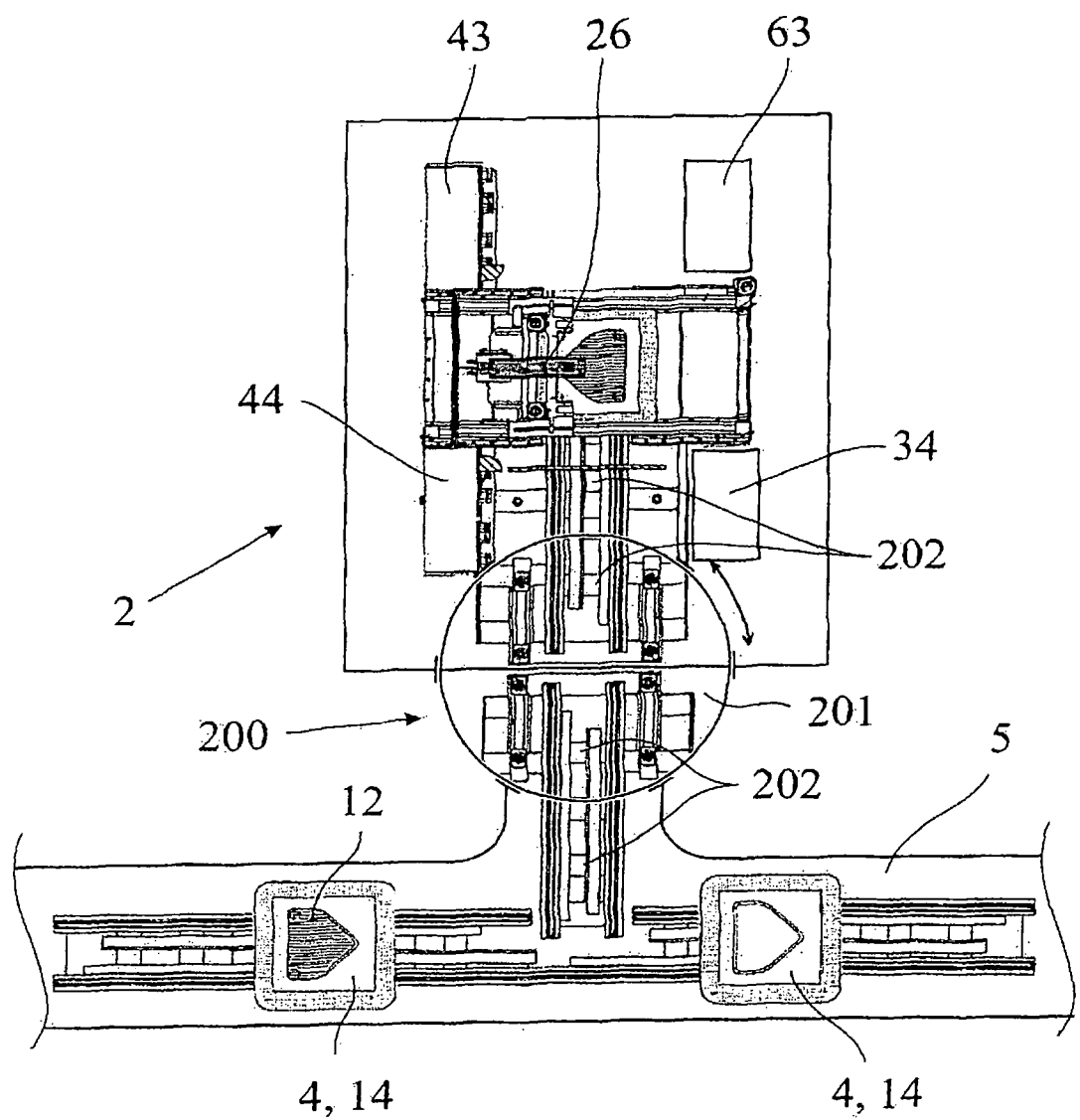
FIG. 6 depicts a further embodiment, in which a unilateral loading device for a fiber placement machine is provided.
Figure 7:
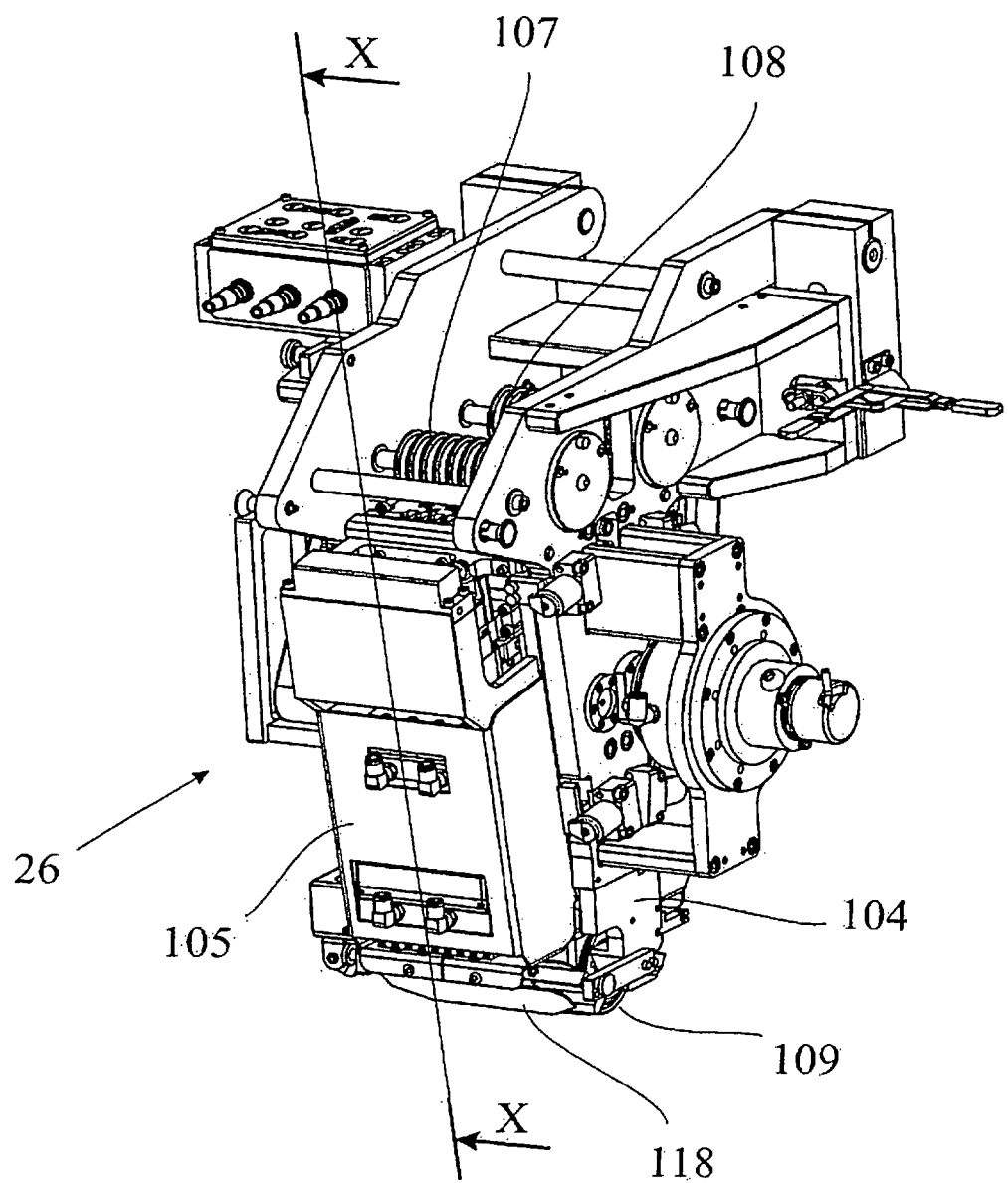
FIG. 7 depicts a spatial view of a placement head of the fiber placement machine in FIG. 2.

In a further embodiment according to FIG. 6, a fiber placement machine is connected via a loading device 200 to the automated conveyor means 4, 5, by means of which loading and unloading of the fiber laying system from one side only is facilitated. The loading device 200 in this case constitutes a T-shaped branch in the conveyor means 4, 5, so that a pallet 14 with the workpiece 12 from the branch can be moved into the fiber placement machine and withdrawn from it in the manner of a blind alley.

In the process, the transport between an outer part of the conveyor means 4, 5 and a processing position in the fiber placement machine is effected via a loading path 202 extending at least partially inside the fiber placement machine. The loading path 202 in its technical implementation can correspond to the previously described guiding of the tool table in the x-axis, for example. In the present case, the loading path 202 branches at a right angle from the conveyor means 4, 5, although other angles may also be envisaged. The loading path 202 can also be arranged in a general embodiment as a linear continuation of an external part of the conveyor means.

The loading device 200 is embodied in particular as a rotational exchange device, which comprises a rotatable holder 201 for receiving at least two workpieces 12. The workpieces 12 in this case are each arranged on their pallet 14. The rotatable holder 201 is adapted for rotating in the manner of a turntable in a substantially horizontal plane. In the process, the rotatable holder for increasing the throughput can be loaded at the same time with an unprocessed workpiece 12 from the outer conveyor means 4, 5, and with a processed workpiece from the fiber placement machine. The holder is subsequently rotated through 180 degrees. The processed workpiece can then be transported further with the conveyor means 4, 5, and the unprocessed workpiece can be moved over the loading path 202 into the fiber placement machine 2.

It will be appreciated that the rotatable holder, depending on the requirements, can also be present in combination with a fiber placement machine 2 that is adapted for loading from both sides, as previously described and depicted in FIG. 1 to FIG. 5.

Figure 2:
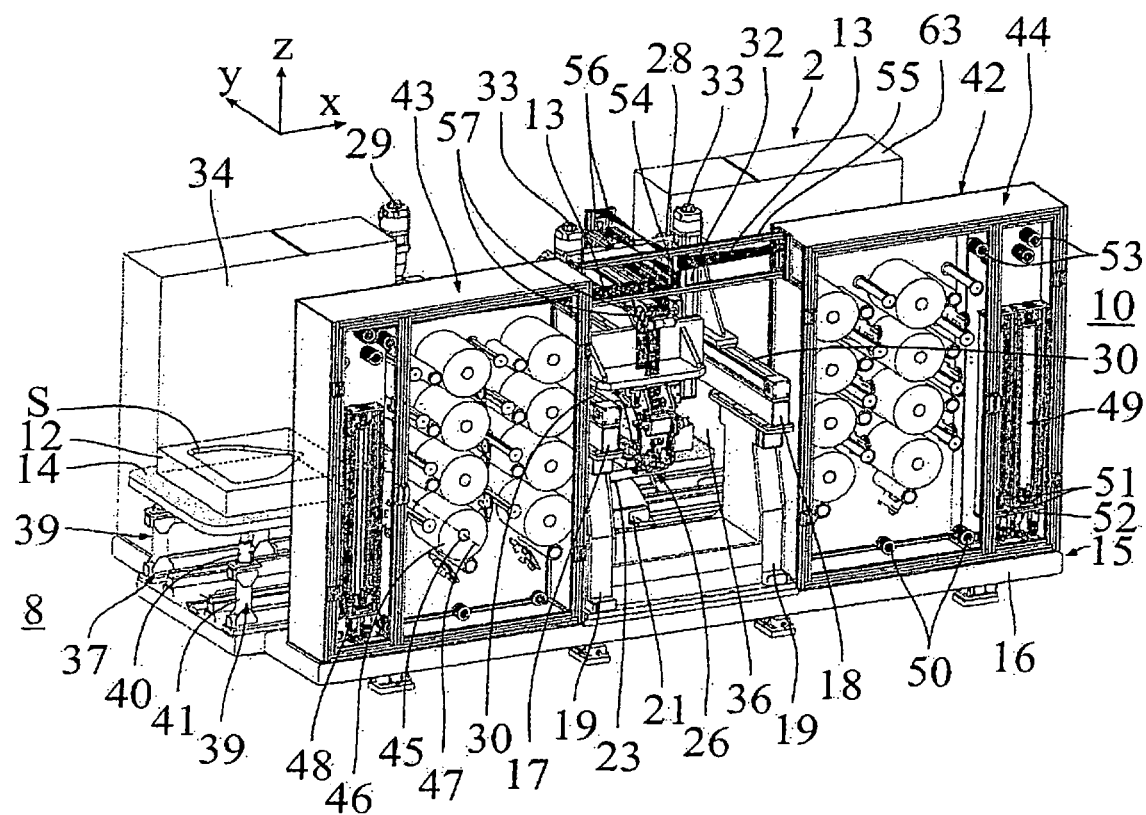
FIG. 2 depicts a perspective view of a fiber placement machine, in particular as a part of the system represented in FIG. 1.

The fiber placement machine depicted in FIG. 6 comprises, as previously described in relation to FIG. 2 to FIG. 4, the placement head 26, which is adapted for displacement in precisely one vertically arranged plane. The placement head 26 is supplied from two fiber coil stores 43, 44. The electrical control unit 34 and the air conditioning unit 63 are represented schematically in their position as further components. In the present case, the loading path 202 extends at a right angle of 90° to the vertically arranged plane of movement of the placement head. The coil axes or axes of rotation of the fiber coils 47 extend parallel to the vertically arranged plane.

Figure 11:
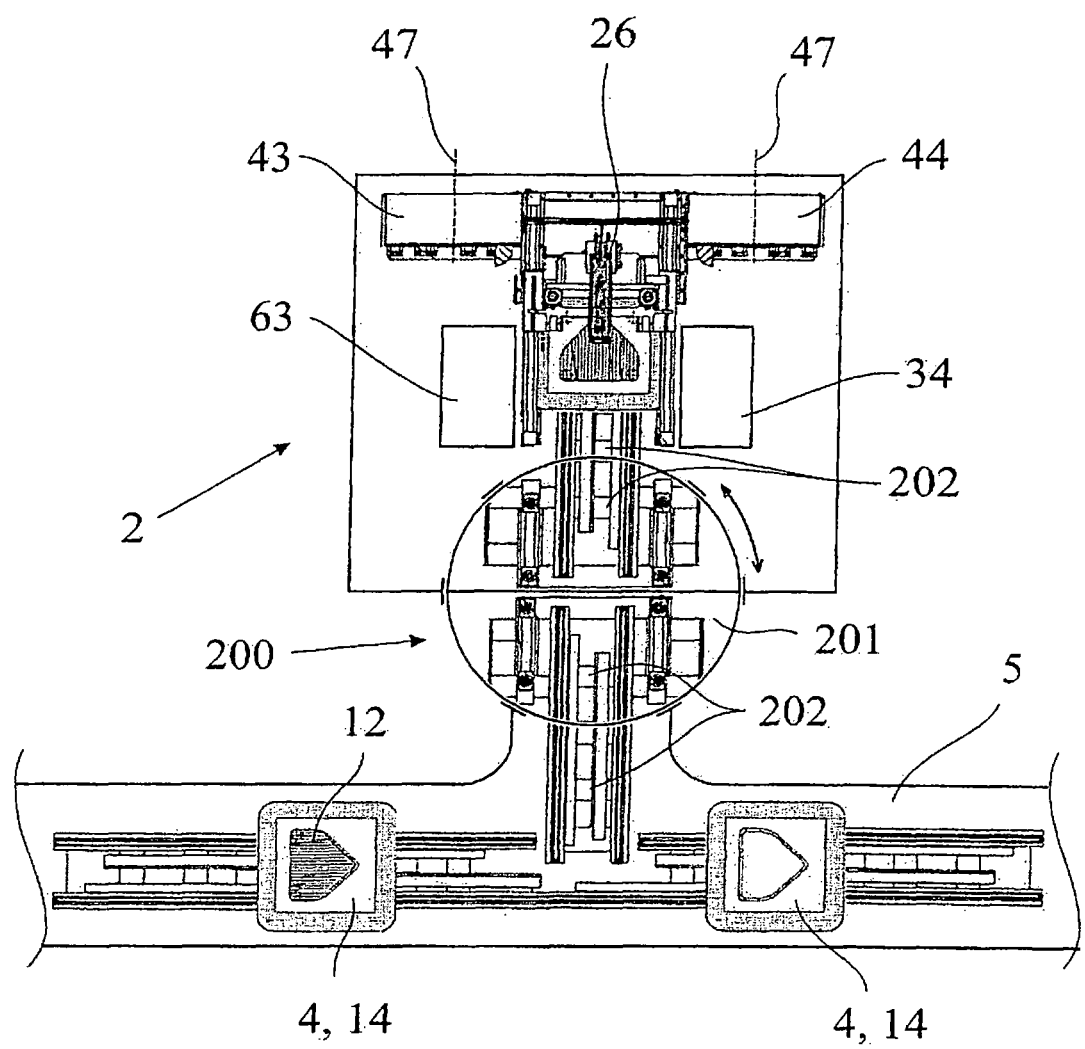
FIG. 11 depicts a first adaptation of the embodiment in FIG. 6.

In the first adaptation depicted in FIG. 11, the tool table has been modified in such a way that the loading path 202 extends parallel to that of the vertically arranged plane, in which the placement head 26 moves. In particular, a central axis of the loading path 202 extends in the vertically arranged plane. The arrangement of the fiber coil stores 43, 44 and of the control unit 34 and of the air conditioning unit 63 accordingly remain the same relative to the placement head, although they have been rotated by 90° together with the placement head relative to the automated conveyor means 4, 5.

Figure 12:
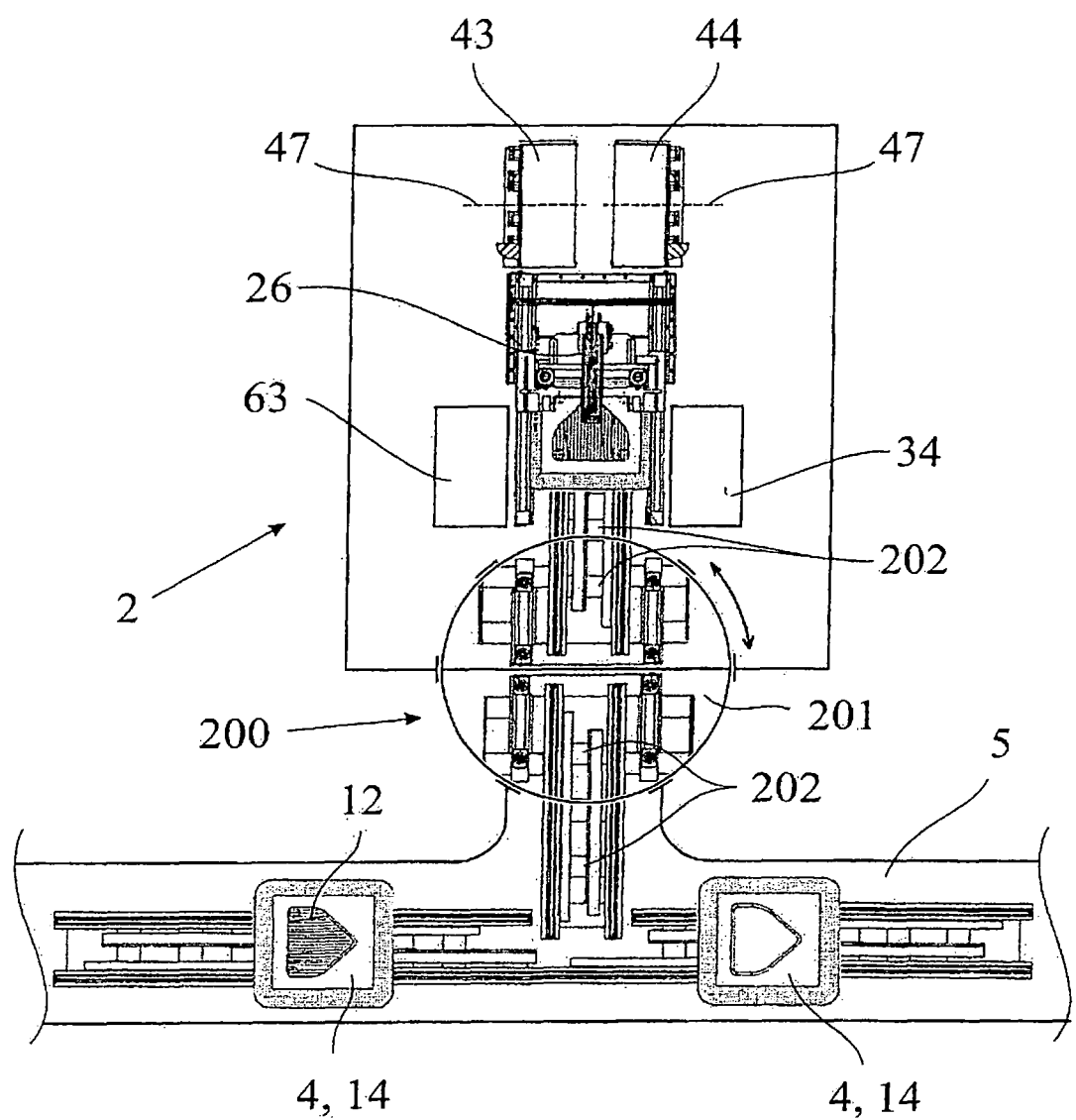
FIG. 12 depicts a second adaptation of the embodiment in FIG. 6.

In the second adaptation depicted in FIG. 12, in addition to the changes in FIG. 11, the fiber coil stores 43, 44 have been rotated by 90° relative to the placement head 26. As a result, the coil axes 47 now extend at an angle of 90° to the vertically arranged plane. Accordingly, the fiber coil stores 43, 44 can be arranged substantially in a line with the placement head 26 and with the loading path 202. This permits a particularly narrow configuration of the fiber placement machine 2.

The aforementioned components of the fiber placement machine, namely the several fiber coil stores 43, 44, the air conditioning unit 63 and the electrical control unit 34, can generally be arranged in any desired manner relative to the placement head 26 and/or the loading path 202. As a result, an external dimension, an outline form, the position of access for maintenance or similar can be adapted to a particular requirement for the fiber placement machine 2.

In the system depicted in FIG. 1 to FIG. 6, the fiber placement machines 2 can be combined with at least one further processing station (not illustrated) for the modification of the workpiece 12, which is distinct from the fiber placement machine 2 described above. These can be both a fiber placement machine of a different design and a processing station which is not configured for laying fibers on the workpiece. The further processing station in this case is connected to the fiber placement machine 2 by means of the automated conveyor means 4, 5.

In particular, the further processing station can be a forming device, in particular a pressing device, by means of which the workpiece 12 is pressed in a processing step following the application of the fibers 13.

As an alternative or in addition, the further processing station is a temperature chamber and/or a painting device. It can also be another processing station, which finds an application in particular in the automated production of aircraft components or automobile components.

In the embodiment depicted by way of example in FIG. 1, in particular the parallel processing of a number of workpieces 12 on their respective pallets 14 is favored. The system in this case comprises a number of structurally identical fiber placement machines 2, which are separated spatially from one another and are connected by means of the automated conveyor means 4, 5. The modifications undertaken to the workpieces 12 are identical in each case.

Figure 5:
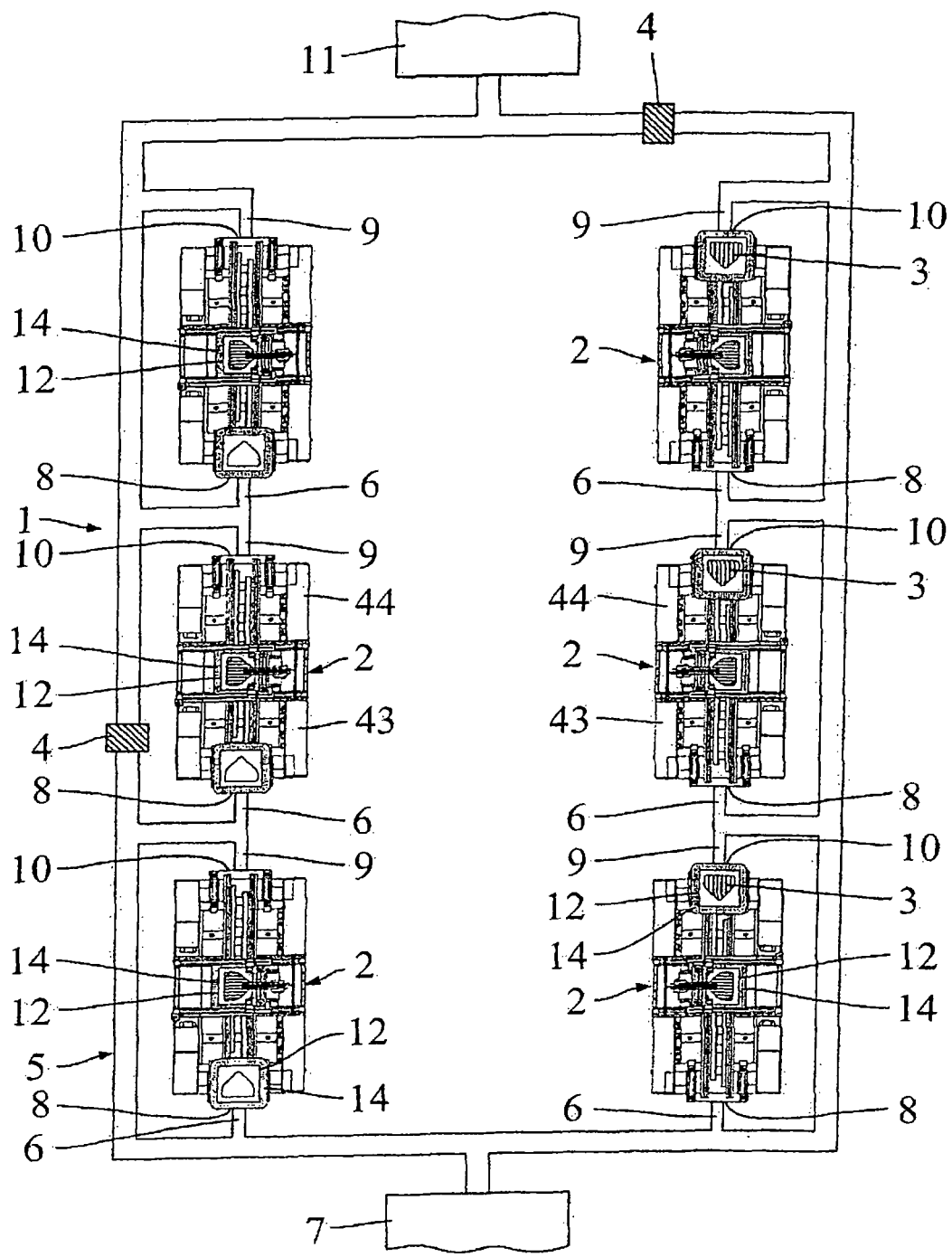
FIG. 5 depicts a schematic representation of a system for the production of fiber composite components according to a second illustrative embodiment having fiber placement machines arranged in relation to one another in a row for the manufacture of fiber layers.

In the embodiment depicted by way of example in FIG. 5, the performance of different processing steps on a workpiece 12 by a number of fiber placement machines 2 as sequential processing stations one after the other is favored in particular. The depicted arrangement can be operated by the appropriate control of the conveyor means 4, 5, for example, arranged as two parallel rows of respectively three fiber placement machines 2 arranged sequentially one after the another between a removal point 7 and a depositing point 11. In a respective row, three different processing steps can then be undertaken one after the other on the same workpiece 12. Different constructed fiber placement machines can be also arranged for this purpose in the respective row. A combination with a processing station that is distinct from a fiber placement machine in a row is also possible.

The removal point 7 and/or the depositing point 11 can be embodied in each case as a buffer station for receiving, storing and transferring a number of workpieces 12. In this way, the buffer stations 11, 12 form an intermediate store for the workpieces 12 on their pallets 14, as a result of which incorporation into an automated total production with corresponding clock rates is improved.

A placement head 26, which is used in a previously described fiber placement machine, is explained in more detail below.

The placement head 26 is arranged as an interchangeable module on the further fiber placement machine 2. As previously described, the placement head 26 can be moved in the y-direction, also referred to below as the direction of laying. In addition, the placement head 26 can be moved in the z-direction perpendicular thereto, in order for it to be placed on the workpiece or raised therefrom. On the whole, the placement head 26 thus moves in precisely one plane, which is tensioned by the y-axis and the z-axis.

The placement head has two feeds 101, 102 extending at an angle to one another, wherein by means of the first feed 101 a first group of fiber strands 13 and by means of the second of the feeds 102 a second group of fiber strands 13 are guided into a crossing region 103, in order to combine the two groups of fiber strands 13 into a fibrous web. In the present case, each group comprises eight fiber strands, so that in all 16 fiber strands 13 are combined into a fibrous web.

Figure 8:
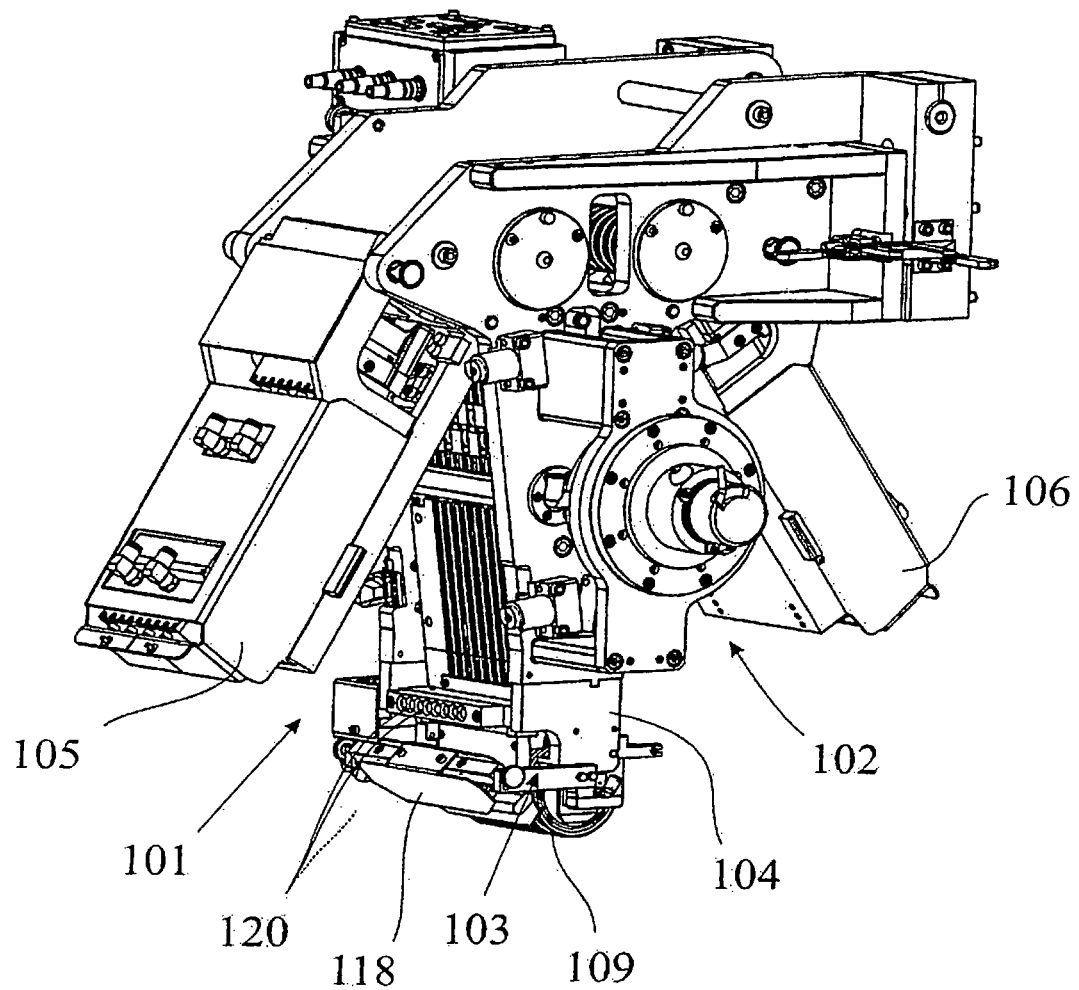
FIG. 8 depicts the placement head in FIG. 7 in a position opened for maintenance purposes.
Figure 9:
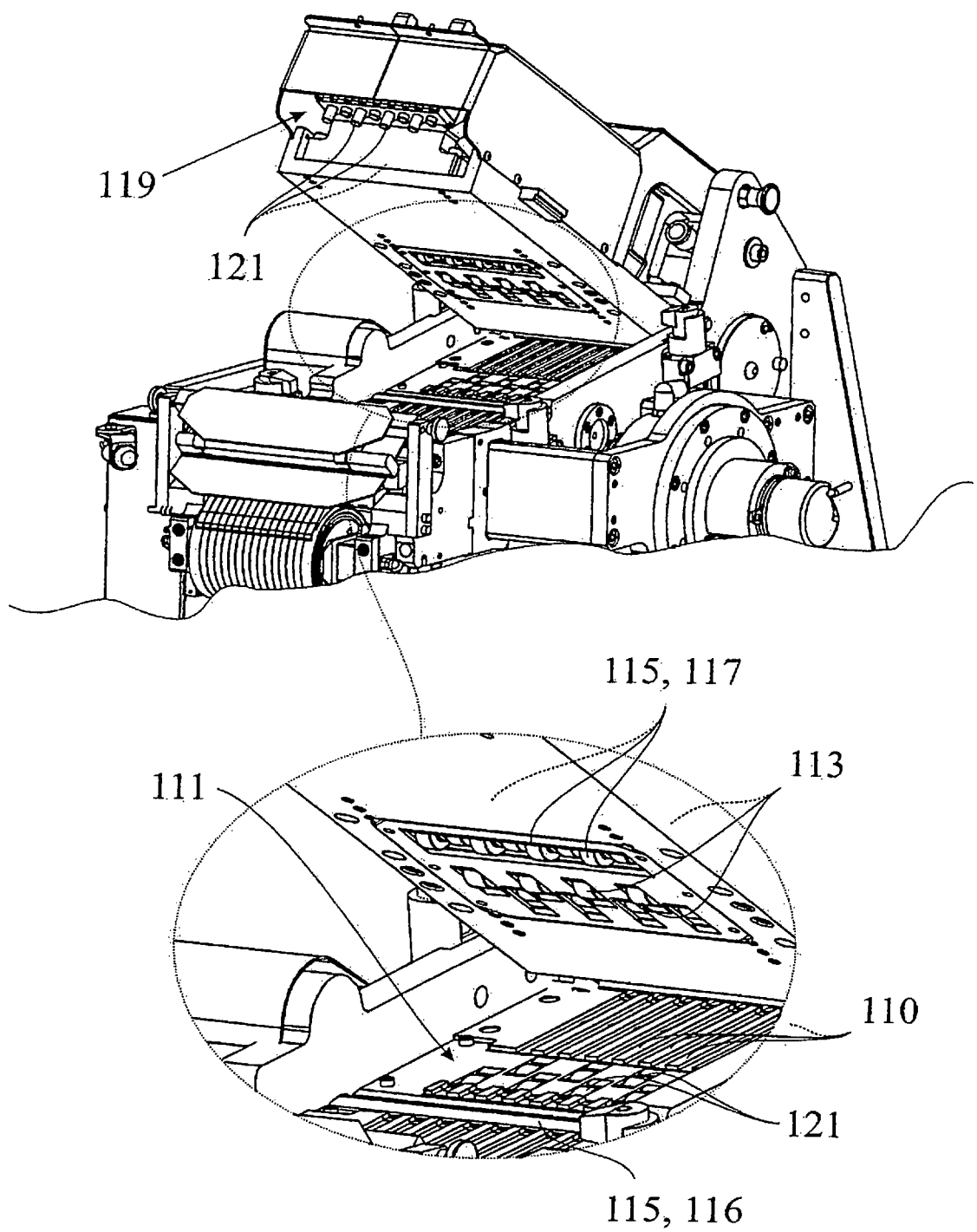
FIG. 9 depicts the placement head in FIG. 8 from another perspective.
Figure 10:
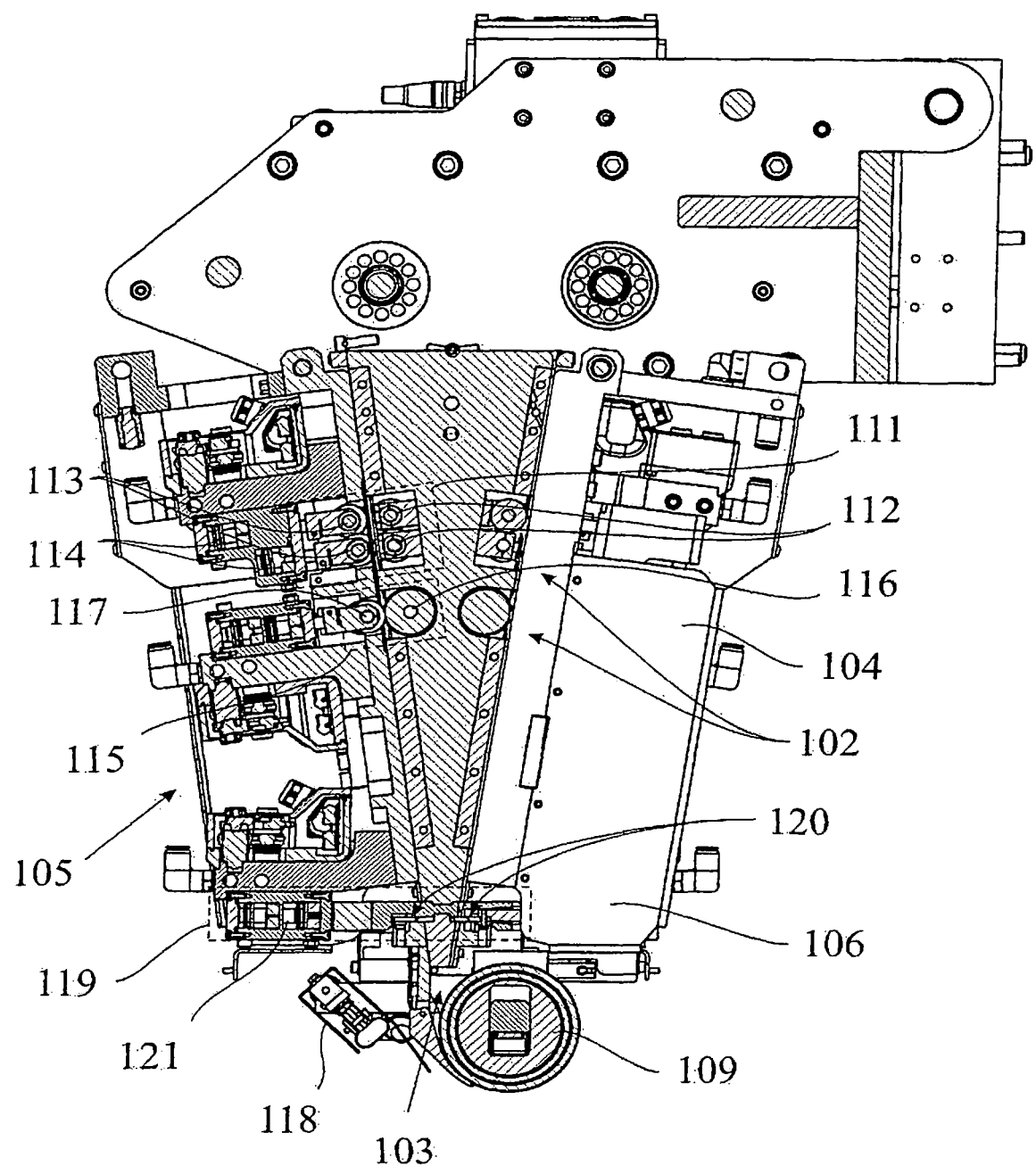
FIG. 10 depicts a sectional view through the placement head in FIG. 7 along the line of intersection X-X.

The feeds 101, 102 extend at an acute angle of about 15° to one another, so that a central region 104 of the placement head 26 is of approximately wedge-shaped form. A releasable upper part 105, 106 is arranged in each case to either side of the wedge-shaped region 104. The upper parts 105, 106 are adapted for being pivoted upwards (see FIG. 8, FIG. 9) with respect to the central region and are removable for maintenance purposes.

The two groups of fiber strands 13 are distributed over roller guides 107, 108 on the two feeds 101, 102 on the input side of the placement head. In each of the feeds 101, 102, the same procedure is adopted with the group of fiber strands 13, so that the placement head is of substantially symmetrical construction with regard to the two feeds 101, 102.

The fiber strands of the two groups are guided around a strand width offset in the transverse direction or perpendicularly to the plane of movement of the placement head, so that a fiber strand 13 of the first group and a fiber strand 13 of the second group are guided into the resulting fiber band in a constantly alternating manner in the crossing region 103 in the transverse direction.

Immediately after being combined in this way, the fiber band extends over a compacting roller 109 arranged on the end side of the placement head, by means of which roller the fiber band is pressed onto the workpiece 12 during laying.

The crossing region 103 and the compacting roller 109 are heated by means of a heating device 118 in the form of a radiant heater, so that a pre-coated binder of the fibers is activated.

The fiber strands 13 are acted upon in the feeds 101, 102 in this case, as described below:

The fiber strands 13 of a feed extend in parallel guide slots 110, which are arranged on the side of the central region 104. In the direction of feed, the fiber strands initially pass through a clamping device 111, and are adapted for being securely clamped and released once more in a controlled manner by means of the fiber strands 13. The clamping device comprises a lower pinch roller 112 arranged on the central region and an upper pinch roller 113 arranged on the upper part for each of the fiber strands 13. A pair of pinch rollers 112, 113 interacting with one another is thus provided for each of the fiber strands, between which rollers the fiber strand can be clamped.

The pinch rollers 113 arranged respectively on the upper part are connected for the purpose of releasable clamping to an actuator 114, by means of which the upper pinch roller 113 can be pressed against the fiber strand 13 and the lower pinch roller 112.

The pairs of pinch rollers 112, 113 are provided in addition with a freewheel in the direction of feed of the fiber strands 13, so that a clamping effect is present only against the direction of feed including in the clamped state.

A pre-feed roller 115 is arranged in the direction of feed behind the clamping device 111. The fiber strands can be driven in the direction of feed by means of the pre-feed roller 115. The pre-feed roller is arranged between the clamping device 111 and the compacting roller 109 of the placement head 26 on the outlet side.

The pre-feed roller 115 is embodied in the present case as pairs of two interacting rollers 116, 117 distributed over the entire width of the group of fiber strands 13. The pre-feed roller is driven by means of a rotary drive unit.

A cutting device 119 is arranged on the placement head between the pre-feed roller 115 and the compacting roller 109 on the outlet side. The fibers or the group of fiber strands 13 are separable by means of the cutting device. For this purpose, the cutting device 119 comprises a plurality of separately controllable cutting members 120, which can separate different parts of the fibers transversely to the direction of laying. In the present case, a separately controllable cutting member 120 is provided in each case for each of the eight fiber strands 13 of a group. A corresponding separate control of the cutting members permits a desired shape of an end or start of the laid fibrous web.

The cutting device 119 in addition comprises an actuator member 121 having eight individual actuators for the individual actuation of the eight cutting members 120. The actuator member 121 in this case is formed separately from the cutting members 120 and is arranged on the respective upper part 105, 106 of the placement head 26. The cutting members 120, on the other hand, are secured to the central region 104. The actuator member 121 is separated from the cutting members 120 after swiveling the upper part 105, 106 upwards, so that the cutting members 120 are accessible for maintenance in a rapid and simple manner.

The placement head 26 now functions as follows:

After laying a section of a fibrous web on a workpiece 12, the fiber strands 13 are separated by the cutting device 119 and a front end of the fiber strands 13 is present in the region of the cutting device. The placement head 26 in the context of a displacement travel is approached in the direction of laying as closely as possible to a last spatially fixed deflection 56 of the fiber supply unit 42. The placement head 26 is then raised from the workpiece by a small amount in the z-direction, so that the compacting roller 109 no longer touches the workpiece 12.

This is followed by clamping of the fiber strands 13 to be laid in the clamping device 111 of the placement head 26.

The placement head 26 is subsequently moved into a starting position in the y-direction relative to the fiber supply unit 42 around a displacement travel. Because of the clamping, the fibers in this case are drawn out from the fiber supply unit 42 around the displacement travel.

The placement head 26 is subsequently moved back a little in the direction of a last deflection 56 of the fiber supply unit, wherein the pre-feed roller 115 feeds the fibers in a driven manner until the fibrous web arrives at the compacting roller 109. In the process, as a result of the movement of the placement head 26, no fibers are drawn from the fiber supply unit 42. In a first section of the pre-feeding of the fibers, the pinch roller can remain in the clamped state, since it has a freewheel in the direction of feed of the fibers.

The clamping device is subsequently released. The placement head 26 is lowered onto the workpiece 12 before or after and is thus present in a starting position for the laying of the fibrous web. If necessary, the workpiece will have been brought into a changed position or orientation in the intervening period.

The placement head 26 is then moved from the starting position into an end position during laying of the fibers 13 on the workpiece 12. Since the fiber strands 13 were previously advanced from the fiber supply unit 42, no fibers 13 are drawn from the fiber supply unit 42 during the laying of the fibers on the workpiece 12.

It will be appreciated that the advancing of the fibers around displacement travel is achievable independently of a positioning of the coil store 43, 44. The drawing out around the displacement travel takes place in each case by the movement of the placement head relative to a last spatially fixed deflection of the fiber supply unit 42. The positioning in particular of the coil store 43, 44 relative to the placement head 26 is accordingly largely freely selectable.

The invention claimed is:

1. A system for production of fiber composite components, comprising:
   at least a first fiber placement machine configured to apply fiber layers to a workpiece, the first fiber placement machine comprising a placement head for laying fibers on the workpiece and a tool table adapted for linear movement along a first axis and for pivoting about a vertical pivot axis; and
   a further processing station, distinct from the first fiber placement machine, for modification of the workpiece, wherein the workpiece can be brought both to the first fiber placement machine and to the further processing station by an automated conveyor.

2. The system as claimed in claim 1, wherein the system comprises a second fiber placement machine, which is spatially separated from the first fiber placement machine and is connected to the first fiber placement machine by the automated conveyor.

3. The system as claimed in claim 2, comprising a number of fiber placement machines as parallel processing stations, which perform the same processing steps on simultaneously processed workpieces.

4. The system as claimed in claim 2, wherein a number of fiber placement machines perform different processing steps on a workpiece one after the other as sequential processing stations.

5. The system as claimed in claim 1, wherein the system comprises at least one buffer station for receiving, storing and transferring a number of workpieces.

6. The system as claimed in claim 1, wherein the further processing station comprises at least one element selected from the group consisting of: a forming device, a temperature chamber and a painting device.

7. The system as claimed in claim 1, wherein the automated conveyor comprises a loading device, by which loading and unloading of the first fiber placement machine from one side only is facilitated.

8. The system as claimed in claim 7, wherein the loading device is configured as a rotational exchange device, which comprises a rotatable holder for receiving at least two workpieces.

9. The system as claimed in claim 1, wherein a placement head of the first fiber placement machine is adapted for displacement in a vertical plane, wherein an angle between the vertical plane and a loading path of the first fiber placement machine is between 0° and 30°.

10. The system as claimed in claim 1, wherein a placement head of the first fiber placement machine is adapted for displacement in a vertical plane, wherein a fiber coil store of the first fiber placement machine comprises a plurality of fiber coils having mutually parallel coil axes, and wherein an angle between the coil axes and the vertical plane is between 60° and 90°.

11. A fiber placement machine for the manufacture of fiber layers with a system as claimed in claim 1, comprising:
   a tool table for feeding a workpiece in a direction of feeding;
   a placement head for the application of fibers to the workpiece; and
   a fiber supply unit for feeding a number of fiber strands to the placement head;
   wherein the number of fiber strands on the placement head are combined into a fibrous web for application to the workpiece;
   wherein the placement head is adapted for displacement relative to the fiber supply unit in a direction of laying; and wherein a clamping device for the releasable clamping of the fiber strands is arranged on the placement head, wherein laying of a section of the fibrous web on the workpiece is effected, after the fiber strands have been advanced around a displacement travel by the placement head, so that no fibers are drawn from the fiber supply unit during the application of the fibers to the workpiece.

12. The fiber placement machine as claimed in claim 11, wherein the fiber supply unit is disposed in a locationally fixed manner, wherein the placement head is movable only in precisely one plane relative to the fiber supply unit.

13. The fiber placement machine as claimed in claim 11, wherein the clamping device is released during laying of the section of the fibrous web.

14. The fiber placement machine as claimed in claim 11, wherein the clamping device comprises at least one pinch roller.

15. The fiber placement machine as claimed in claim 11, wherein the placement head comprises two feeds extending at an angle with respect to one another, wherein by a first of the feeds a first group of fiber strands and by the second of the feeds a second group of fiber strands are guided into a crossing region, in order to combine the two groups of fiber strands into the fibrous web.

16. The fiber placement machine as claimed in claim 11, wherein the fibers are adapted for separation by a cutting device arranged on the placement head, wherein the cutting device comprises a plurality of separately controllable cutting members, which are able to separate different parts of the fibers transversely to the direction of laying.

17. The fiber placement machine as claimed in claim 16, wherein the cutting device comprises an actuator member for the actuation of at least one of the cutting members, wherein the actuator member is formed separately from the cutting member and is arranged on a removable upper part of the placement head.

18. The fiber placement machine as claimed in claim 11, comprising at least one pre-feed roller for the driven feed on the placement head, wherein the pre-feed roller is arranged between the clamping device and a compacting roller of the placement head on the outlet side.

19. The fiber placement machine as claimed in claim 11, wherein the fiber placement machine is constructed entirely on a machine frame.

20. The fiber placement machine as claimed in claim 11, wherein the fiber placement machine comprises a climatically sealed housing.

21. The fiber placement machine as claimed in claim 11, wherein the workpiece is arranged on an automatically transportable pallet.

22. The fiber placement machine as claimed in claim 21, wherein a surface of the pallet supporting the workpiece is inclined by an angle of less than 30 degrees with respect to a vertical.

23. The fiber placement machine as claimed in claim 22, wherein the direction of laying extends in a plane which is inclined at less than 30 degrees with respect to the vertical.

24. The fiber placement machine as claimed in claim 11, wherein the respective fiber strands are wound onto interchangeable coils, wherein the coils sit on axes of rotation that are driven against an unwinding direction, wherein the drives for the axes of rotation exhibit a torque limitation.

25. A method for laying a fibrous web on a workpiece by a fiber placement machine as claimed in claim 9, comprising:
   clamping the fibers to be laid in a clamping device of a placement head;
   moving the placement head relative to a fiber supply unit into a starting position, wherein the fibers are drawn from the fiber supply unit about a displacement travel;
   releasing the clamping device;
   moving the placement head from the starting position into an end position during laying of the fibers on the workpiece, so that no fibers are drawn from the fiber supply unit during the application of the fibers to the workpiece.

26. The method as claimed in claim 25, wherein the fibers are moved with respect to the placement head after releasing the clamping device by a driven pre-feed roller, wherein the fibers are not drawn from the fiber supply unit by the pre-feed roller.

* * * * *